US012618315B2

(12) United States Patent
Warren et al.

(10) Patent No.: US 12,618,315 B2
(45) Date of Patent: May 5, 2026

(54) SLURRY PROPORTIONER SYSTEM

(71) Applicant: Halliburton Energy Services, Inc., Houston, TX (US)

(72) Inventors: Wesley John Warren, Duncan, OK (US); Chad A. Fisher, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 47 days.

(21) Appl. No.: 18/632,633

(22) Filed: Apr. 11, 2024

(65) Prior Publication Data

US 2025/0320802 A1 Oct. 16, 2025

(51) Int. Cl.

| | |
|---|---|
| ***E21B 43/26*** | (2006.01) |
| ***B01F 23/50*** | (2022.01) |
| ***B01F 35/71*** | (2022.01) |
| ***B01F 101/49*** | (2022.01) |
| ***E21B 43/267*** | (2006.01) |

(52) U.S. Cl.

CPC .......... *E21B 43/267* (2013.01); *B01F 23/581* (2022.01); *B01F 35/714* (2022.01); *E21B 43/2607* (2020.05); *B01F 23/59* (2022.01); *B01F 2101/49* (2022.01)

(58) Field of Classification Search

CPC .. E21B 43/2607; E21B 21/062; B01F 23/581; B01F 35/714; B01F 2101/49

See application file for complete search history.

(56) References Cited

U.S. PATENT DOCUMENTS

| | | | |
|---|---|---|---|
| 3,161,203 | A | 12/1964 | Hathorn et al. |
| 3,766,986 | A | 10/1973 | Kiel |
| 4,563,123 | A | 1/1986 | Beck |

(Continued)

FOREIGN PATENT DOCUMENTS

| | | | |
|---|---|---|---|
| WO | 2012097425 | A1 | 7/2012 |
| WO | 2016090201 | A1 | 6/2016 |

OTHER PUBLICATIONS

Foreign Communication from Related Application—International Search Report and Written Opinion of the International Searching Authority, International Application No. PCT/US2024/026943, dated Dec. 24, 2024, 12 pages.

(Continued)

*Primary Examiner* — Catherine Loikith

(74) *Attorney, Agent, or Firm* — Conley Rose, P.C.; Rodney B. Carroll

(57) ABSTRACT

Provided is a proportioner having one or more proportioner inlets to receive a common concentrated proppant fluid comprising a proppant, two or more flow lines fluidly connected to the one or more proportioner inlets, two or more proportioner outlets, each of the two or more proportioner outlets associated with one of the two or more flow lines, one or more fluid inlets, each of the one or more fluid inlets for introducing a proppant-free fluid to the proportioner, and a metering system associated with at least one of the two or more flow lines. Each metering system is positioned upstream of the proportioner outlet of the flow line with which it is associated and is fluidly connected with at least one of the one or more fluid inlets for proportioning one of the proppant-free fluids into the associated flow line at an injection point.

20 Claims, 7 Drawing Sheets

(56) References Cited

U.S. PATENT DOCUMENTS

| | | | |
|---|---|---|---|
| 6,644,844 | B2 | 11/2003 | Neal et al. |
| 7,090,017 | B2 | 8/2006 | Justus et al. |
| 7,845,413 | B2 | 12/2010 | Shampine et al. |
| 8,251,570 | B2 | 8/2012 | Hughes et al. |
| 9,447,673 | B2 * | 9/2016 | Medvedev ............ E21B 43/267 |
| 9,816,509 | B2 | 11/2017 | Blaumann et al. |
| 10,569,242 | B2 | 2/2020 | Stegemoeller et al. |
| 10,675,601 | B2 | 6/2020 | Fisher |
| 11,441,068 | B2 | 9/2022 | Mazrooee et al. |
| 11,506,032 | B1 | 11/2022 | Fisher et al. |
| 11,519,252 | B2 | 12/2022 | Kramer et al. |
| 11,585,197 | B2 | 2/2023 | Mazrooee et al. |
| 11,591,888 | B2 | 2/2023 | Yeung et al. |
| 11,639,653 | B2 | 5/2023 | Bolen et al. |
| 11,834,940 | B1 | 12/2023 | Kohli et al. |
| 2003/0044272 | A1 | 3/2003 | Addie et al. |
| 2004/0136825 | A1 | 7/2004 | Addie et al. |
| 2007/0125543 | A1 | 6/2007 | McNeel et al. |
| 2007/0277982 | A1 | 12/2007 | Shampine et al. |
| 2008/0023681 | A1 | 1/2008 | Cunningham |
| 2010/0254214 | A1 | 10/2010 | Fisher et al. |
| 2012/0255734 | A1 | 10/2012 | Coli et al. |
| 2014/0262338 | A1 | 9/2014 | Shen et al. |
| 2014/0352968 | A1 | 12/2014 | Pitcher et al. |
| 2016/0169221 | A1 | 6/2016 | Stephenson et al. |
| 2018/0209254 | A1 | 7/2018 | Ghasripoor et al. |
| 2020/0197883 | A1 | 6/2020 | Oklejas, Jr. |
| 2021/0310346 | A1 | 10/2021 | Bull et al. |
| 2022/0403723 | A1 | 12/2022 | Yeung et al. |
| 2023/0032405 | A1 | 2/2023 | Warren |
| 2023/0106807 | A1 | 4/2023 | Coli et al. |
| 2023/0313654 | A1 | 10/2023 | Yeung et al. |
| 2023/0332492 | A1 | 10/2023 | Hamida et al. |

OTHER PUBLICATIONS

Foreign Communication from Related Application—International Search Report and Written Opinion of the International Searching Authority, International Application No. PCT/US2024/026945, dated Dec. 27, 2024, 9 pages.

Foreign Communication from Related Application—International Search Report and Written Opinion of the International Searching Authority, International Application No. PCT/US2024/026946, dated Jan. 3, 2025, 11 pages.

Filing Receipt, Specification and Drawings for U.S. Appl. No. 18/632,640, entitled "Multi-Well Blending System," filed Apr. 11, 2024, 84 pages.

Filing Receipt, Specification and Drawings for U.S. Appl. No. 18/632,641, entitled, "System To Optimize Centrifugal Pumps and Manifolding in Variable Rate Slurry Pumping Applications," filed Apr. 11, 2024, 56 pages.

Freemyer Industrial Pressure, Jul. 2023 Information Journal, Dual Electric Blender For Test Pad; https:/www.indpress.com/update/may-2023-information-journal-wnpbl-9mkdr.

First Office Action dated Oct. 16, 2024 (8 pages), U.S. Appl. No. 18/632,640, filed Apr. 11, 2024 .

* cited by examiner

SLURRY PROPORTIONER SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Subterranean hydraulic fracturing is conducted to increase or "stimulate" production from a hydrocarbon well. To conduct a fracturing process, high pressure is used to pump special fracturing fluids, including some that contain propping agents ("proppants") down-hole and into a hydrocarbon formation to split or "fracture" the rock formation along veins or planes extending from the well-bore. Once the desired fracture is formed, the fluid flow is reversed and the liquid portion of the fracturing fluid is removed. The proppants are intentionally left behind to stop the fracture from closing onto itself due to the weight and stresses within the formation. The proppants thus literally "prop-apart", or support the fracture to stay open, yet remain highly permeable to hydrocarbon fluid flow since they form a packed bed of particles with interstitial void space connectivity. Sand is one example of a commonly-used proppant. The newly-created-and-propped fracture or fractures can thus serve as new formation drainage area and new flow conduits from the formation to the well, providing for an increased fluid flow rate, and hence increased production of hydrocarbons.

Two or more wells clustered together can be stimulated simultaneously with the same fracturing equipment.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
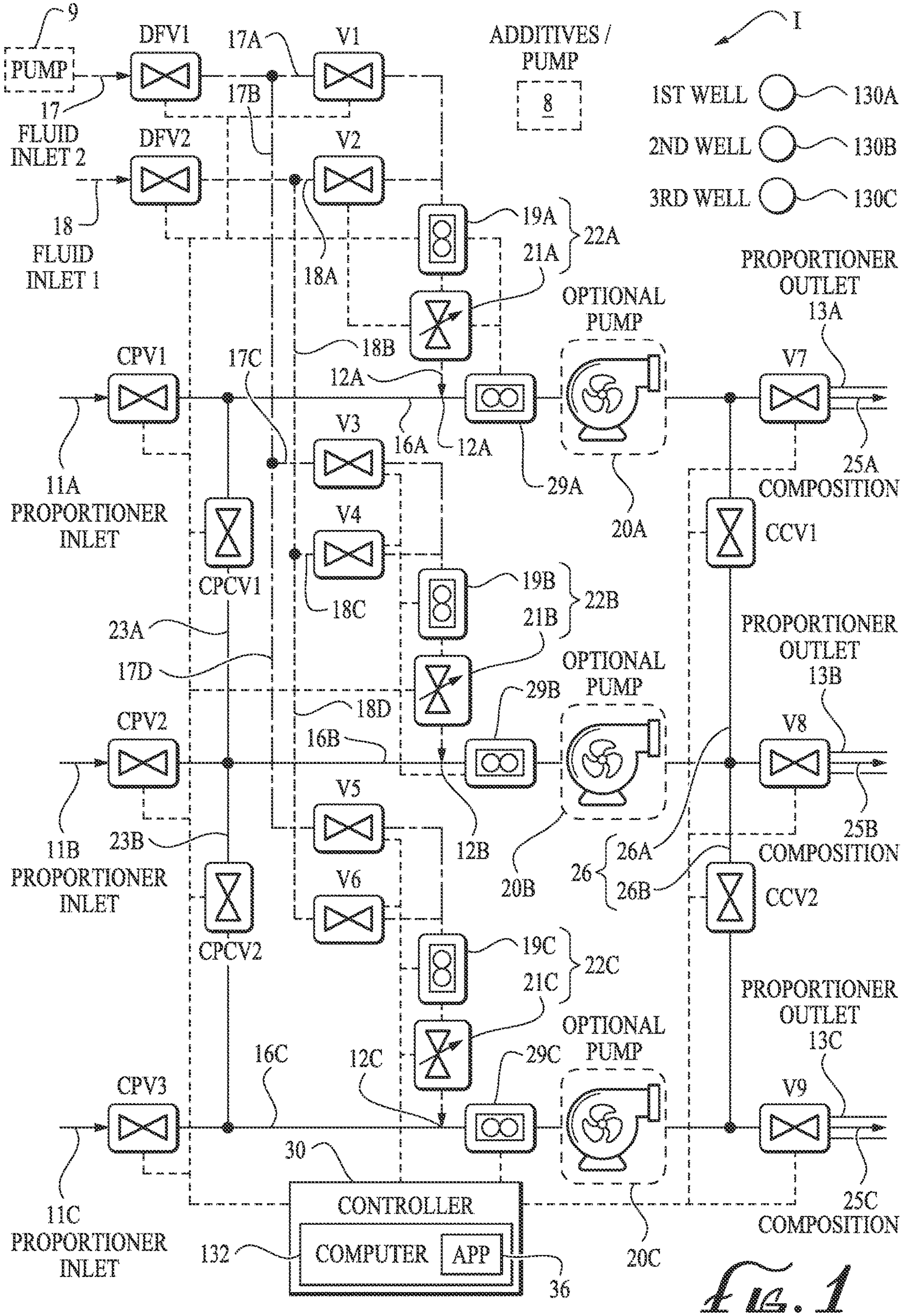
FIG. 1 is a schematic of a proportioner, according to embodiments of this disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". For example, reference to flow lines 16 can, in instances, include flow line 16A, flow line 16B, flow line 16C, or a combination thereof.

A modern fracturing fleet typically includes a water supply, a proppant supply, one or more mixers or blenders, a plurality of frac pumps, and a fracturing manifold connected to the wellhead. The individual units of the fracturing fleet can be connected to a central control unit called a data van. The control unit can control the individual units of the fracturing fleet to provide treatment fluid (e.g., proppant slurry) at a desired rate to a wellhead. The control unit can manage the pump speeds, chemical intake, and proppant density while pumping fracturing fluids and receiving data relating to the pumping from the individual units.

Multiple well completion techniques can be used to maximize operational use of equipment and personnel. Some oil fields have multiple wells drilled from a single pad. The placement of multiple wells within a single pad or area allows for a smaller footprint of production equipment. Multiple wells on a single pad also can also allow for hydraulic fracturing multiple wells without relocating the fracturing equipment. One such technique, called zipper fracturing, allows a single fracturing fleet to treat multiple wells by alternating the pumping operation from one well to another well. Another technique allows for multiple wells to be treated simultaneously. The hydraulic fracturing fleet can connect to two or more wells to pump the hydraulic fracturing treatment into the two or more wells at the same time.

In embodiments, the fracturing fleet can be divided into a clean pumping group and a dirty pumping group. The clean pumping group pumps "clean" fluid or fluid without proppant. The "dirty" pumping group pumps dirty fluid or fluid with proppant. The clean pumping group can split the fluid output from the high pressure fracturing pumps associated therewith to a first well and a second well. The dirty pumping group can split the dirty fluid output from the fracturing pumps associated therewith into the first well and the second well. Each well, the first well and the second well, can receive a combined treatment volume. The combined treatment volume can be designed to produce the desired fractures within the respective formation. The dirty pumping group can be comprised of pumping equipment with an increased reliability to reduce the chance of equipment malfunction during pumping. The clean pumping group can comprise pumping equipment with a lower reliability than the pumping equipment used for the dirty pumping group, as the clean fluid can be less abrasive and induce a lower level of stress on the pumping equipment. Utilizing pumping equipment with a reduced reliability to pump the less abrasive clean fluid can increase the pumping capacity of the frac fleet.

Accordingly, fracturing ("frac") blenders ("blenders", "mixers", and "mixing tubs" being used interchangeably herein) have typically been designed for blending fracturing fluid to be delivered to a single well, but now simultaneous multi-well fracturing operations (e.g., simulfrac for two wells and trimulfrac for three wells) are needed. (See, for example, U.S. patent application Ser. No. 11/585,197, US20210310346, and U.S. Pat. No. 11,639,653, the disclosures of each of which are hereby incorporated herein for purposes not contrary to this disclosure).

Compromises are generally accepted when using a blender originally designed for single well operations to mix fluid for simulfrac work. The main issues include the following. Firstly, the transition between clean fluid (also referred to herein as "substantially proppant-free fluid") and proppant laden fluid (e.g., proppant slurry, also referred to herein as "dirty" fluid) must occur at the same time for all wells supplied by the blender, although at times it would perhaps be beneficial to transition to flushing one well while continuing to pump proppant laden fluid to the other well(s). Secondly, when using a single blender for simulfrac operations, a common proppant concentration must be delivered to all wells, although at times it may be more desirable deliver different proppant concentrations to each of the multi wells that are simultaneously fractured, for example, to change the proppant concentration on one well while continuing to pump the original concentration to the other well(s). Thirdly, the criticality of blender down time is increased with multi frac (e.g., simulfrac, trimulfrac) operations, since blender down time in situations with only one blender can result in non-productive time for multiple wells. Additionally, the frequency of equipment failures can increase for multi-well simultaneous fracturing, since the intensity of blender usage (volume of proppant and fluids pumped per unit time) is generally increased relative to fracturing of a single well.

Accordingly, herein disclosed is a is a slurry proportioner system (also referred to herein simply as a "proportioner"). The herein disclosed fluid proportioner is a device that can be used to augment a conventional, single well blender or mixer for multi well simultaneous operation or can be used with a multi-well blending unit, such as described in U.S. patent application Ser. No. 18/632,640, filed Apr. 11, 2024, now U.S. Pat. No. 12,281,557, and entitled, "Multi-Well Blending System", the disclosure of which is hereby incorporated herein in its entirety for purposes not contrary to this disclosure.

In embodiments, as further detailed hereinbelow with reference to FIG. 1, which is a schematic of a proportioner according to embodiments of this disclosure, a proportioner I of this disclosure can comprise two or more independent flow lines 16 (e.g., flow line 16A, flow line 16B, and flow line 16C in the embodiment of FIG. 1), each of the two or more flow lines 16 having/associated with a proportioner outlet 13 (e.g., proportioner outlet 13A, proportioner outlet 13B, and proportioner outlet 13C depicted in the embodiment of FIG. 1); and one or more proportioner inlets 11 (e.g., proportioner inlet 11A, proportioner inlet 11B, and proportioner inlet 11C, as depicted in the embodiment of FIG. 1) fluidly connected to a common concentrated proppant fluid supply (e.g., a blender or mixing tub 10 for providing a proppant slurry (also referred to herein as a "concentrated proppant fluid", "concentrated slurry", or "concentrated proppant slurry") 11')) for providing the common (i.e., the same) concentrated proppant fluid 11' to each of the two or more flow lines 16.

The proportioner is supplied a concentrated slurry 11' from a slurry blender or mixer 10 and is also supplied a dilution fluid 14 that can be used for diluting the concentrated slurry 11'. As noted hereinabove, the fluid proportioner I includes multiple proportioner outlets 13. Each outlet 13 may be dedicated to an individual well 130 of the multiple wells (e.g., first well 130A, second well 130B, and third well 130C depicted in the embodiment of FIG. 1) being simultaneously fractured. Upstream of each proportioner outlet 13 is a metering arrangement 22 that can be used to proportion the dilution fluid(s) 14 to the concentrated slurry 11' in flow lines 16. This can allow the fluid proportioner I to be fed by the blender/mixer 10 with a single proppant concentration while delivering, to multiple wells 130, fluid compositions 25 having independently controlled proppant concentrations.

As detailed further hereinbelow, a proportioner I of this disclosure can optionally further comprise a plurality of discharge or boost pumps 20 (referred to hereinafter simply as "discharge pumps 20"). A discharge pump 20 can be positioned on each of the flow lines 16. Each discharge pump 20 can be dedicated to delivering fluid via a proportioner outlet 13 to a single well of two or three (or more) wells being treated simultaneously. Each discharge pump 20 can be associated with a flow line 16. By injecting a dilution fluid 14 (e.g., typically water/an aqueous fluid, a friction reducer, etc.), the composition (e.g., sand/proppant concentration, friction reduced concentration, etc.) of the fluid 25 delivered to each well 130 can be customized while mixing proppant in a single mixing tub 10.

Accordingly, the proportioner I can be equipped with a pump 20 in each flow line 16. The pump 20 can be used to increase the proportioner discharge pressure above the pressure at the proportioner inlet(s) 11. This can be used to augment the boost pressure provided by the blender (e.g., by a blender discharge pump associated with mixing tub/blender 10 of FIG. 2A and FIG. 2B). This can be useful if a higher boost pressure than what is supplied by the blender 10 is desired.

If the proportioner is equipped with the optional pumps 20, it may be useful to decrease the discharge pressure at the blender 10 so that the proportioner dilution inlet fluid 14 is injecting into a lower pressure fluid stream and/or to extend the service life of the pump installed on the blender 10.

In embodiments, such as described further hereinbelow, a substantially proppant-free composition 25 can be provided by one of the flow lines 16, and another of the flow lines 16 can provide a composition 25 comprising a proppant slurry, thus enabling switching to flushing any one well 130 while continuing to provide proppant laden fluid (e.g., proppant slurry) to other well(s) 130.

In embodiments, such as described further hereinbelow, crossover lines 26 connect one (e.g., an extra or "backup") flow line 16 to one, two or more other flow line 16. In this manner, a flow line 16 and associated metering system 22 can serve as a backup to one or more other flow lines 16 and associated metering systems 22. This can be useful, for example, when the proportioner I is operated in "split flow mode" (e.g., one flow line 16 is providing proppant laden fluid while another flow line 16 provides a substantially proppant-free fluid).

A proportioner of this disclosure will now be described in more detail with continued reference to FIG. 1, which is a schematic of a proportioner I according to embodiments of this disclosure. As noted above, a proportioner of this disclosure can comprise two or more independent proportioner outlets 13, with three, including proportioner outlet 13A, proportioner outlet 13B, and proportioner outlet 13C, depicted in the embodiment of FIG. 1. Each outlet proportioner outlet 13 can supply a composition 25 (e.g., a proppant laden fluid or a proppant-free fluid) to a particular well 130 (with three, including first well 130A, second well 130B, and third well 130C, depicted in the embodiment of FIG. 1). In embodiments, the proportioner I can be equipped with three outlets 13, such that it can deliver independent proppant (e.g., sand) concentrations for fracturing three wells 130 simultaneously.

In embodiments, a proportioner I of this disclosure comprises: one or more proportioner inlets 11 (with three, include proportioner inlet 11A, proportioner inlet 11B, and proportioner inlet 11C depicted in the embodiment of FIG. 1) configured to receive a common (e.g., the same) concentrated proppant fluid (e.g., concentrated proppant slurry 11' provided by blender/mixer 10 of FIG. 2A or FIG. 2B) comprising a proppant (118, as described with reference to FIG. 3 hereinbelow). The proportioner I can further comprise two or more flow lines 16 fluidly connected to the one or more proportioner inlets 13; and two or more proportioner outlets 13, each of the two or more proportioner outlets 13 associated, connected, and/or integrated with (a different) one of the two or more flow lines 16. The proportioner I can include one or more fluid inlets 17/18 (with two, including a first fluid inlet 17 and a second fluid inlet 18 depicted in the embodiment of FIG. 1). Each of the one or more fluid inlets 17/18 can be configured to introduce a (e.g., same or different) proppant-free fluid 14 to the proportioner I. A (one or more) metering system 22 can be associated with each of the two or more flow lines 16, each metering system 22 upstream of the proportioner outlet 13 of the flow line 16 with which it is associated and each metering system 22 fluidly connected with at least one or each of the one or more fluid inlets 17/18 and configured for proportioning the proppant-free fluid(s) 14 into the associated flow line 16 at an injection point (also referred to herein as an "injection port") 12. The proportioner I of FIG. 1 includes three injection points, including injection point 12A at/via which metering system 22A introduces proppant-free fluid(s) to flow line 16A, injection point 12B at/via which metering system 22B introduces proppant-free fluid(s) 14 to flow line 16B, injection point 12C at/via which metering system 22C introduced proppant-free fluid(s) to flow line 16C.

A dilution fluid valve DFV can be positioned on each of the fluid inlets 17/18. For example, a dilution fluid valve DFV1 can be positioned on dilution fluid inlet 17 to control flow of a first dilution fluid 14 into proportioner I and a second dilution fluid valve DFV2 can be can be positioned on dilution fluid inlet 18 to control flow of a second dilution fluid 14 into proportioner I. Valves V can be utilized to control the flow of the proppant-free fluid within the proportioner. For example, in the embodiment of FIG. 1, valves V1, V3, and V5 can control the flow of the first dilution fluid 14 from dilution fluid inlet 17 to metering systems 22A, 22B, and 22C, respectively, and valves V2, V4, and V6 can control the flow of the second dilution fluid 14 from dilution fluid inlet 18 to metering systems 22A, 22B, and 22C, respectively. Any number of dilution fluids 14 can be introduced to proportioner I, each dilution fluid introduced via a fluid inlet 17/18.

The proportioner could have more than one dilution inlet, in embodiments. A piping and valving arrangement can be provided to allow selective connection of any one dilution inlet to each of the dilution metering systems 22. This can allow for the usage of different dilution fluids 14 to be used for each well 130. Such an embodiments could be used, for example, when sources of both fresh water and produced water are available. With two dilution inlets, fresh water can be used as the dilution fluid 14 for some wells 130 while produced water can be used as the dilution fluid 14 for one or more of the remaining wells 130.

It can thus be advantageous, in embodiments, to include two or more dilution inlets 17/18 and also two or more dilution metering arrangements 22 fluidly connected to each proportioner outlet 13. Such embodiments can enable, for example, dilution using a blend of both fresh and produced water. In other embodiments, one dilution metering arrangement 22 can be utilized for introducing water (as dilution fluid) with a low concentration (or zero concentration) of an additive, such as friction reducer, and a second dilution metering arrangement 22 can be utilized for introducing a water source with a high concentration of an additive, such as a (same or different) friction reducer. Such embodiments can be utilized to a customize a friction reducer concentration and proppant (e.g., sand) concentration delivered to each well 130.

The fluid proportioner can comprise one or more proportioner inlets 11 and at least one dilution fluid inlet (e.g., first dilution fluid inlet 17 and/or second dilution fluid inlet 18). The proportioner inlets 11 receive proppant laden fluid 11' (e.g., from a frac blender or mixing tub 10). Since the proportioner I is supplied with a common fluid 11', in embodiments, the proportioner I can have only a single proportioner inlet 11 or it may include a dedicated proportioner inlet 11 for each proportioner outlet 13. For example, with reference to the embodiment of FIG. 1, in embodiments, a single proportioner inlet (e.g., proportioner inlet 11A, 11B, or 11C) is present, and a concentrated proppant crossover line 23 and concentrated proppant crossover valve CPCV is utilized to provide the concentrated proppant fluid 11' to each of the flow lines 16. For example, a concentrated proppant crossover line 23A and a concentrated proppant crossover valve CPCV1 can be utilized to introduced concentrated proppant 11' to flow line 16B, and a concentrated proppant crossover line 23A and a concentrated proppant crossover valve CPCV2 can be utilized to introduced concentrated proppant 11' to flow line 16C. In such embodiments, only a single proportioner inlet 11 may be present/utilized. Accordingly, the proportioner I of this disclosure can include a piping/valve arrangement (e.g., concentrated proppant crossover lines 23 and valves CPCV) that will allow for use of either a single inlet (e.g., 11A or 11B or 11C) or individual, isolated inlets 11A, 11B, and 11C as shown in FIG. 1. The proportioner I of this disclosure can thus comprise a single proportioner inlet 11 or comprises a plurality of proportioner inlets 11 with each of the plurality of proportioner inlets 11 fluidly connected to (e.g., a different) one of the two or more flow lines 16.

Each proportioner outlet 13 is fluidly connected to a proportioner inlet 11A and an independent dilution metering arrangement or system 22. The dilution metering arrangement 22 meters dilution fluid 14 into the slurry stream in the flow line 16. This allows the proportioner outlets 13 to deliver a composition 25 comprising a desired proppant (e.g., sand) concentration below the "concentrated" concentration provided at the proportioner inlet 11. The dilution metering system 22 can comprise a metering device 21 (e.g., a metering valve 21, such as a butterfly valve, a gate valve, or a ball valve) and a flowmeter 19 for measuring the amount of dilution fluid(s) 14 delivered. A flowmeter 29 for each proportioner outlet 13 can also be included on the flow line 16 associated therewith, for measuring either the amount of slurry fluid 11' provided to the proportioner outlet 13 or the total combined fluid rate of the slurry fluid plus the added dilution fluid. For example, a flowmeter 29A can be located on flow line 16A upstream of injection point 12A to measure either the amount of slurry fluid 11' provided to the proportioner outlet 13A or downstream of injection point 12A to measure the total combined fluid rate of the slurry fluid 11' plus the added dilution fluid 14 (e.g., the flow rate of the composition 25A) in flow line 16A. Similarly, a flowmeter 29B can be located on flow line 16B upstream of injection point 12B to measure either the amount of slurry fluid 11' provided to the proportioner outlet 13B or downstream of injection point 12B to measure the total combined fluid rate of the slurry fluid 11' plus the added dilution fluid 14 (e.g., the flow rate of the composition 25B) in flow line 16B, and a flowmeter 29CA can be located on flow line 16C upstream of injection point 12C to measure either the amount of slurry fluid 11' provided to the proportioner outlet 13C or downstream of injection point 12C to measure the total combined fluid rate of the slurry fluid 11' plus the added dilution fluid 14 (e.g., the flow rate of the composition 25C) in flow line 16C. The flow meters 29 on each flow line 16 can be upstream or downstream of a pump 20, described further herein, when such pump 20 is present.

In embodiments, the metering device 21 can be a metering pump (e.g., a progressive cavity pump, gear pump, vane pump, lobe pump, circumferential piston pump, piston pump, diaphragm pump, etc.). In such embodiments utilizing a metering pump, the flowmeter 19 may not be required/utilized. An alternative to using flowmeter 19 would be to use two flowmeters installed in the flowline 16A/16B/16C, one upstream and one downstream of the injection point 12A/12B/12C; this can allow for indirect measurement of the amount of dilution fluid injected (e.g., from the one or more fluid inlets 17 and/or 18, etc.). For example, flowmeters 19A/19B/19C can be positioned on flow line 16A/16B/16C, and flow meters 29A/29B/29C downstream of the injection point 12A/12B/12C, as depicted in FIG. 1.

In embodiments, flowmeters 29 can be mounted remotely from the proportioner unit. For example, in embodiments, the flowmeters 29 can be installed on manifolds 124 described hereinbelow with reference to FIG. 3, FIG. 4, and FIG. 5. If installed remotely, the flowmeters could either be directly wired into the proportioner control system 132 or there could be a network connection between a control system 132 of the unit containing the flowmeters and the proportioner control system 132.

In embodiments, each metering system 22 can comprise a flow meter 19 and a throttling valve 21 configured to (proportionally, e.g., such that the flow rate of the proppant-free fluid 14 is a proportion of the flow rate of the concentrated proppant slurry 11' with which it is combined in the flow line 16) introduce a proppant-free flow rate of the proppant-free fluid(s) 14 introduced by at least one of the one or more fluid inlets 17 and/or 18 into a flow rate of the concentrated proppant fluid 11' in the flow line 16 associated with the each metering system 22. For example, in the embodiment of FIG. 1, metering system 22A comprises flow meter 19A and throttling valve 21A, metering system 22B comprises flow meter 19B and throttling valve 21B, and metering system 22C comprises flow meter 19C and throttling valve 21C. Each metering system 22 is configured to meter dilution fluid(s) from fluid inlet 17 and/or fluid inlet 18 to the flow line 16 with which the metering system 22 is associated. As noted hereinabove, one or a plurality of dilution fluids 14 can be introduced. For example, a fluid inlet 17 can be utilized to introduce dilution fluid comprising water, while a fluid inlet 18 can be configured to introduce a non-water dilution fluid, such as for example and without limitation, a friction reducer or friction reducer enhanced water. Although the amount of friction reducer added may not substantially dilute the concentrated proppant slurry 11' introduced via proportioner inlet 11, such will herein also be referred to as a "dilution fluid."

As mentioned hereinabove, the dilution fluid(s) 14 can be delivered, via the metering system 22, at the required ratio or "proportion" to produce a desired diluted proppant concentration in each composition 25.

The common concentrated proppant fluid (or proppant slurry) 11' provided to each proportioner inlet 11 can comprise a concentrated proppant slurry from a single mixer (e.g., mixing tub) 10. Alternatively, the common concentrated proppant fluid (or proppant slurry) 11' provided to each proportioner inlet 11 can comprise a concentrated proppant slurry from a plurality of benders or mixing tubs 10. Another option for the source of concentrated proppant slurry can be a supply vessel of "liquid sand", such as described, for example, in U.S. Pat. No. 11,441,068, the disclosure of which is hereby incorporated in its entirety for purposes not contrary to this disclosure.

The proportioner I can further comprise a boost or "discharge" pump 20 on each of the flow lines 16. For example, a discharge pump 20 A is depicted on flow line 16A, a discharge pump 20B is depicted in flow line 16B, and a discharge pump 20C is depicted on flow line 16C in the embodiment of FIG. 1. The discharge pumps can be located upstream or downstream from the injection point 12 of the flow line 16. For example, in the embodiment of FIG. 1, discharge pump 20A is positioned on flow line 16A downstream of injection point 12A, discharge pump 20B is positioned on flow line 16B downstream of injection point 12B, and discharge pump 20C is positioned on flow line 16C downstream of injection point 12C. The injection point can be upstream or downstream of a pump 20. For example, in embodiments, the injection point 12 associated with each of the flow lines 16 can be located downstream from the discharge pump 20 on that flow line 16. In embodiments, the injection point 12 associated with each of the flow lines 16 can be located upstream from the discharge pump 20 on that flow line 16.

The proportioner I can comprise a concentrated proppant valve CPV at each proportioner inlet 11 that can be closed such that all fluid for a given outlet 13 can be provided by the dilution fluid inlet 17 and/or 18. In this way, the proppant concentration of a composition 25 provided by a proportioner outlet 13 can be reduced (e.g., to 0 pounds (lbs)/gal) while the other proportioner outlets 13 continue to deliver a composition 25 comprising a proppant laden fluid. For example, in embodiments, the proportioner I comprises a concentrated proppant valve CPV on the each flow line 16 upstream of the injection point 12, such that the proportioner I is operable to produce a proppant slurry composition 25 comprising the proppant 118 from at least one of the two or more proportioner outlets 13 and simultaneously produce a substantially proppant-free fluid composition 25 from the proportioner outlet 13 of at least one other of the two or more proportioner outlets 13 by closing the concentrated proppant valve CPV on the flow line 16 associated with the at least one other of the two or more proportioner outlets 13.

The proportioner of this disclosure can further comprise a control system 30 operable to control operation of the proportioner I to provide a desired fluid composition 25 from each of the proportioner outlets 13. The fluid composition 25 provided via the proportioner outlet 13 of at least one of the two or more flow lines 16 can have a different proppant concentration and/or a different concentration of a proppant-free fluid 14 (e.g., friction reducer, water, etc.) introduced by at least one of the fluid inlets 17/18 than the composition 25 provided by the proportioner outlet 13 of at least one other of the two or more flow lines 16. As depicted in the embodiment of FIG. 1, proportioner I comprises control system 30 connected to the flowmeters 19/29, valves V, and metering valves 21, such that the control system 30 can take an input of desired composition (e.g., proppant (e.g., sand) concentration) for each proportioner outlet 13 and control the metering valve 21 to deliver that desired composition (e.g., concentration). The control system 30 can utilize the concentrated proppant 11' concentration (e.g., of the concentrated proppant fluid 11' in proportioner inlets 11) prior to addition of the dilution fluid 14 as an input to calculate the correct dilution rate from each of the metering valve systems 22.

There may be a crossover line(s) 26 at the proportioner outlets 13. The crossover line(s) 26 can include valves (e.g., composition crossover valves CCV and valves V) that isolate the (e.g., three) proportioner outlets 13 when closed or can selectively connect the proportioner outlets 13 when open. In this way the proportioner I can use one metering arrangement system 22 as a backup. Referring to FIG. 1, if proportioner outlets 13A and 13C are used, the flow line 16B and associated metering arrangement 22B can be in reserve as backup. If backup is needed, metering arrangement 22B can be activated and one of the valves in the crossover line 26 opened so that the metering arrangement 22B can be connected to either proportioner outlet 13A or outlet 13C.

Accordingly, with continued reference to FIG. 1, a proportioner I of this disclosure can further include a crossover line(s) (or flow path) 26 fluidly connecting each of the two or more flow lines 16, downstream of the injection point 12, with at least one other of the two or more flow lines 16, and a composition crossover valve CCV on the crossover line 26. The composition crossover valve CCV can be opened or closed to permit or prevent fluid flow between the each flow line 16 and the at least one other of the two or more flow lines 16. Valves V proximate each proportioner outlet 13 can be utilized to allow or prevent fluid flow out that proportioner outlet 13. For example, valves V7, V8, and V9 can be positioned on discharge lines 16A, 16B, 16C, proximate proportioner outlets 13A, 13B, 13C, to allow or prevent fluid flow therethrough. For example, in the embodiment of FIG. 1, composition crossover valve CCV1 can be opened (with composition crossover valve CCV2 closed) to allow flow of fluid composition 25A from flow line 16A through composition crossover line 26A and out proportioner outlet 13B (when valve V7 is closed and valve V8 is open) or composition crossover valve CCV2 can be opened (with composition crossover valve CCV1 closed) to allow flow of fluid composition 25C from flow line 16C through composition crossover line 26B and out proportioner outlet 13B (when valve V9 is closed and valve V8 is open). Similarly, composition crossover valve CCV1 can be opened (with composition crossover valve CCV2 closed) to allow flow of fluid composition 25B from flow line 16B through composition crossover line 26A and out proportioner outlet 13A (when valve V7 is open and valve V8 is closed) or composition crossover valve CCV2 can be opened (with composition crossover valve CCV1 closed) to allow flow of fluid composition 25B from flow line 16B through composition crossover line 26B and out proportioner outlet 13C (when valve V9 is open and valve V8 is closed).

The fluid proportioner I can be a self-contained unit (e.g., either skid or trailer 47 mounted). For example, the proportioner of this disclosure can be configured on a skid, a truck, multiple skids, a trailer 47, or a combination of one or more thereof. In embodiments, a proportioner of this disclosure can be built into the manifold trailer 124; this embodiment could reduce the number of units on location and the number of hoses to rig up (e.g., no separate proportioner unit or inlet/outlet hoses to the proportioner).

The proportioner outlet 13 associated with a first of the two or more flow lines 16 can be fluidly connected with a first well 130A and a proportioner outlet 13 of a second of the two or more flow lines 16 can be fluidly connected with a second well 130B, wherein the first well 130A and the second well 130B are different wells.

The proportioner outlet 13 associated with at least one of the two or more flow lines 16 can be fluidly connected with a first fracturing manifold 124 (described hereinbelow with reference to FIG. 3, FIG. 4, and FIG. 5) fluidly connected with a first set of (e.g., high pressure) fracturing pumps 122 configured to introduce a first dirty fluid (e.g., comprising proppant 118) into a first well 130A, and the proportioner outlet 13 associated with at least one other of the two or more flow lines 16 can be fluidly connected with a second fracturing manifold 124 fluidly connected with a second set of (e.g., high pressure) fracturing pumps 122 configured to introduce a clean or second dirty fluid (e.g., comprising proppant) into a second (e.g., different) well 130B. A proppant concentration of the first dirty fluid can be different from a proppant concentration of the second dirty fluid.

The equipment on the proportioner I can be powered hydraulically, electrically, mechanically, pneumatically, or by several other sources. The power provided may be a combination of several of these types.

The proportioner I can further include liquid additive metering pumps for supplying additives for modifying the fluid composition(s) 25. The liquid additive metering pumps can be injected individually near each proportioner outlet 13 to customize the additive blend delivered to each of the three proportioner outlets 13. The proportioner I can include liquid additive injection ports that can be supplied additives from additive metering systems and/or pumps located remote from the proportioner I. These liquid additives could be injected into the dilution fluid stream (e.g., in dilution fluid inlet 17 and/or 18), the undiluted or concentrated slurry stream 11' near the proportioner inlets 11 (e.g., upstream of injection port 12), and/or into the individual proportioner outlet 13 comprising the fluid composition 25. Individual additives would typically comprise less than 1% of total fluid (e.g., less than 10 gallons per ton (gpt)) and can be inconsequential to dilution of the slurry 11'; in contrast, the dilution fluid 14 can typically be added at a concentration of greater than 50 gpt, in embodiments.

With reference to FIG. 1, a proportioner I of this disclosure can further comprise liquid additive metering pump(s) 8 for supplying additives for modifying the fluid composition(s) 25. The additive may be injected either into common proppant supply 11', into proportioner outlet line(s) 13. The metering systems 22 and injection ports 12, and/or additional metering systems and injection points/ports (not shown), can be utilized for introduction of the liquid additives. If injected downstream, the additives supplied and the concentration for each additive can be customized for each of the (e.g., three) proportioner outlets 13.

As further described hereinbelow with reference to FIG. 3, FIG. 4, and FIG. 5, a proportioner of this disclosure can be used for multiple (e.g., three) well simultaneous fracturing using the split flow method. In this method, each of the multiple (e.g., three) proportioner outlets 13 can supply (e.g., same or different) slurry fluid composition 25 to one of multiple (e.g., three) banks of dirty fluid frac pumps, each connected to a different well head/well 130. A clean fluid supply can also be connected to multiple (e.g., three) banks of clean fluid frac pumps 122, each connected to one of the multiple (e.g., three) wellheads 130. In this arrangement the wellhead proppant (e.g., sand) concentration can be a dilution of the proppant concentration delivered from each proportioner outlet 13 by the clean fluid supplied by the bank of clean fluid frac pumps 122. This dilution can be controlled by the supervisory control system 40' (described further hereinbelow with reference to FIG. 3, FIG. 4, and FIG. 5) of the frac spread.

In embodiments, the fluid proportioner of this disclosure can also include a pump 9 to supply and pressurize the fluid 14 supply connected to one or more (e.g., all) the dilution inlet(s) 17/18.

Although depicted in the example embodiment of FIG. 1 with three proportioner outlets 13, a proportioner of this disclosure can comprise any plurality of outlets (e.g., 2, 3, 4, 5, or more). The number of proportioner outlets 13 can equal the maximum number of wells 130 that could be simultaneously fractured with independent compositions 25 (e.g., independent proppant (e.g., sand) concentrations) provided by the proportioner I. In embodiments, the number of proportioner outlets 13 can equal the number of wells 130 plus some number of backup outlets.

As noted hereinbelow with reference to the embodiments of FIG. 3, FIG. 4, and FIG. 5, the control system 30 described hereinabove as being on the proportioner I can, in embodiments, be a supervisory control system 40' for either the full fracturing system or some portion of the fracturing system (e.g., all blending equipment for example). This could include controlling the proppant (e.g., sand) concentration in the compositions 25 provided at the proportioner outlets 13. Such a supervisory control system 40' could also control the treatment fluid (e.g., slurry proppant (e.g., sand) concentrations) at each wellhead 130. If the split flow method is used in the fracturing process, the proppant concentration delivered to the wellhead 130 will be lower than the concentration at the proportioner outlet 13. In embodiments, the proportioner is subsystem of a larger blending unit, rather than a self-contained unit.

Figure 3:
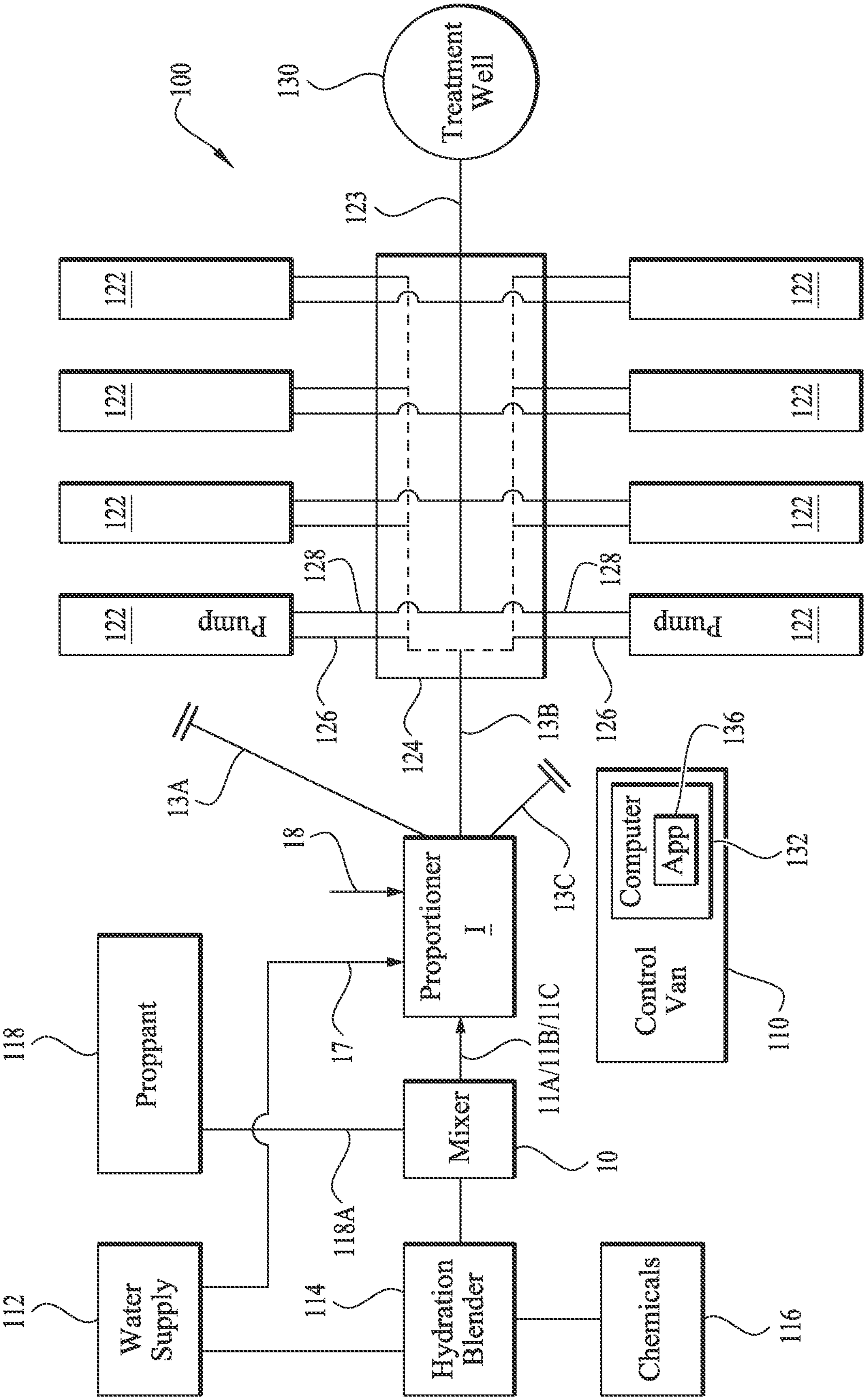
FIG. 3 is a block diagram of a hydraulic fracturing system treating one well, the hydraulic fracturing system comprising a proportioner according to embodiments of the disclosure.
Figure 4:
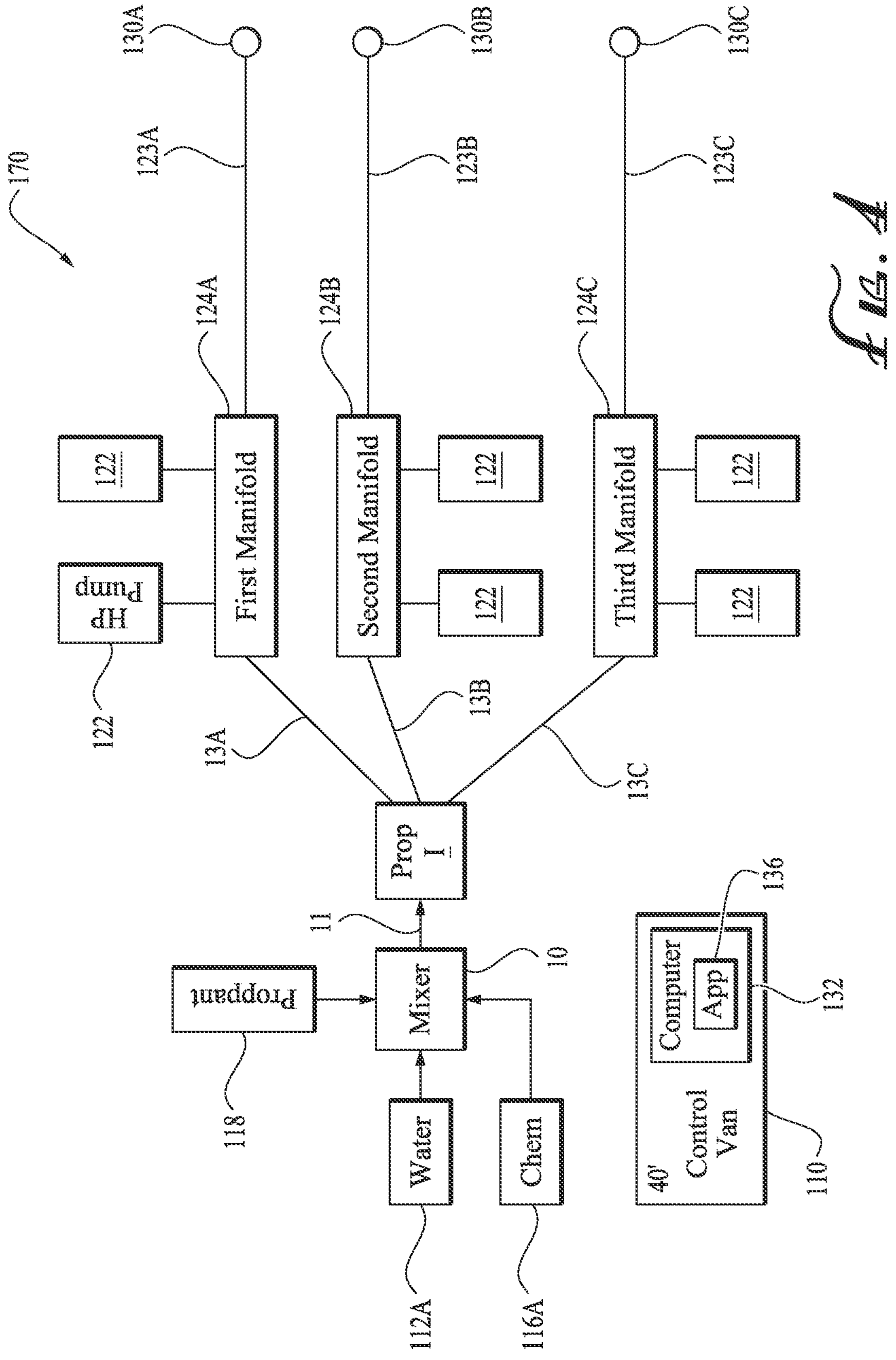
FIG. 4 is a block diagram of a hydraulic fracturing system treating three wells, the hydraulic fracturing system comprising a proportioner according to embodiments of the disclosure.
Figure 5:
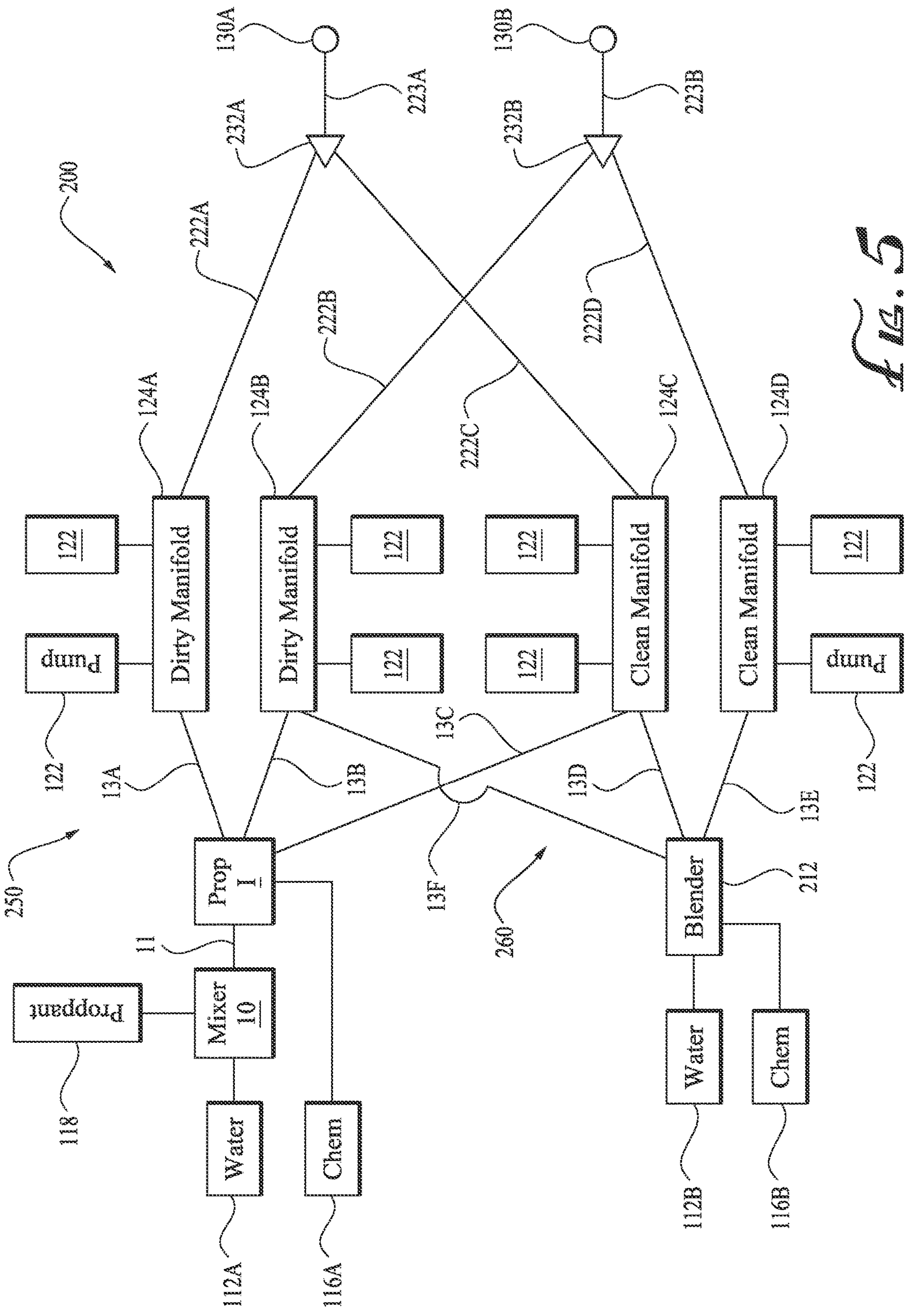
FIG. 5 is a block diagram of a hydraulic fracturing system treating two wells with two pumping groups, the hydraulic fracturing system comprising a proportioner according to embodiments of the disclosure.
Figure 6:
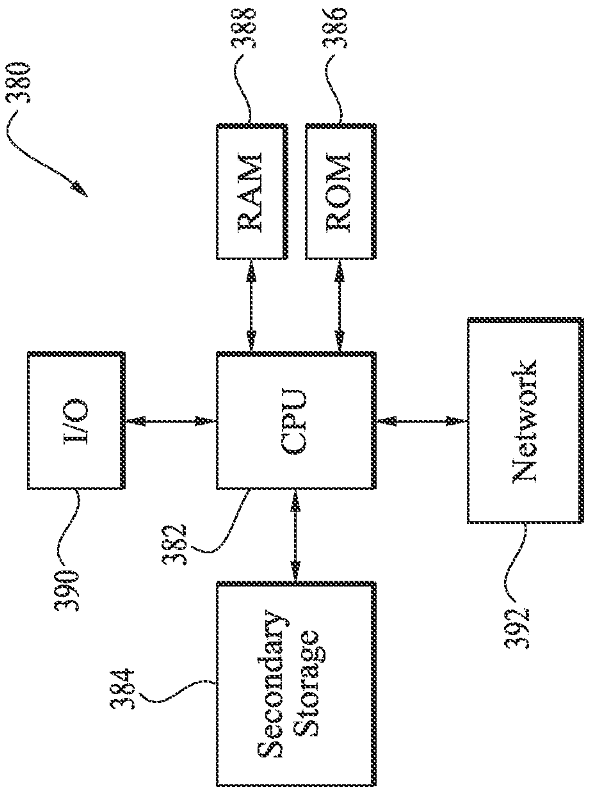
FIG. 6 is a block diagram of a computer system according to embodiments of the disclosure.

As detailed further herein with reference to FIG. 3, FIG. 4, and FIG. 5, the proportioner of this disclosure can be utilized for simultaneous fracturing a plurality of wells 130. In embodiments, the proportioner of this disclosure can be utilized for simultaneous fracturing of a plurality of wells 130 using the split flow method. In some such embodiments, the multiple (e.g., three) proportioner outlet lines 13 can supply a slurry fluid composition 25 (e.g., via a dirty manifold or missile) to multiple (e.g., three) banks of dirty fluid frac pumps 122, each connected to a different well head of a well 130. A clean fluid supply can also be connected (e.g., via a clean manifold or missile) to multiple (e.g., 3) banks of clean fluid frac pumps 122, each connected to the multiple (e.g., three) wellheads 130. In such embodiments, the wellhead proppant (e.g., sand) concentration will be a dilution of the proppant concentration delivered from each proportioner outlet line 13 by the clean fluid supplied by the bank of clean fluid frac pumps 122. This dilution can be controlled by a supervisory control system (e.g., control system 40' of FIG. 6, which can be the same as or different from controller 30) of the frac spread.

In this disclosure where the term "clean" fluid is used, it indicates a fluid that is substantially free of proppant. However, a clean fluid can comprise many different waters. For example, the water of a clean fluid can comprise a fresh water, produced water, flowback water, or other water source and may contain additives such as friction reducers, polymers, biocides, pH adjusters, breakers. The term clean is only used to denote that the fluid is substantially free of (e.g., added) proppant.

Although the concentrated proppant slurry fluid 11' is described as being produced via a slurry mixing tub 10, other types of mixers are envisioned and within the scope of this disclosure. For example, and without limitation, in embodiments, the mixer utilized to provide concentrated proppant slurry in common proppant line 11' can be a centrifugal style mixer. In embodiments, the herein disclosed proportioner I can comprise more than one mixer or mixing tub 10, although in embodiments only one mixing tub 10 is utilized.

Figure 2A:
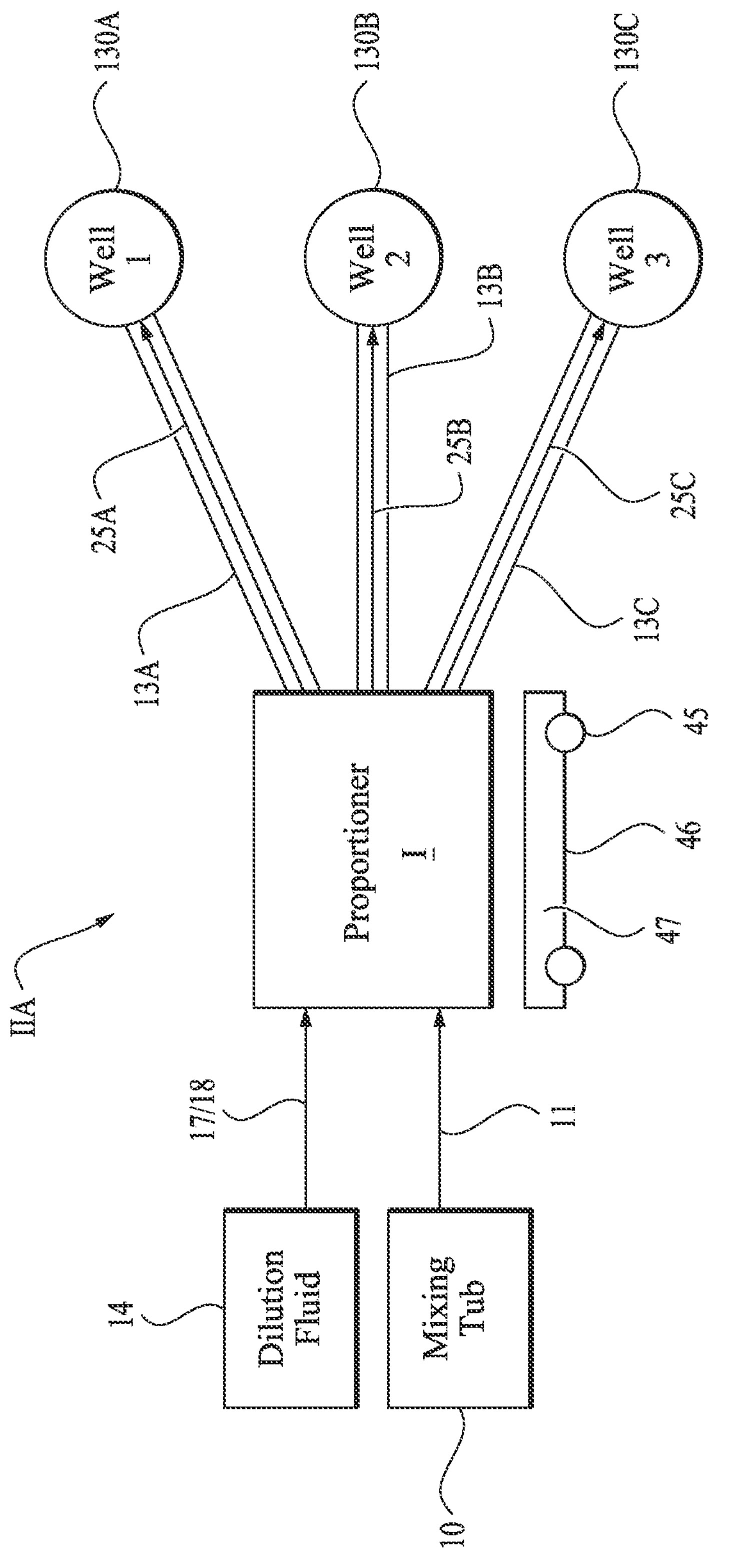
FIG. 2A is a schematic of a system, according to embodiments of this disclosure.

As depicted in FIG. 2A, which is a schematic of a system IIA, according to embodiments of this disclosure, a proportioner I of this disclosure can receive one or more dilution fluids 14 and a single concentrated, common proppant fluid 11 from a blender/mixing tub 10 to provide a plurality of outlet compositions 25 via proportioner outlets 13. The proportioner I can be positioned on a skid, multiple skids, or a trailer 47 comprising wheels 45 and a support structure 46. In embodiments, such as depicted in FIG. 2A, proportioner I provides three proportioner outlet compositions 25A, 25B, and 25C, via three proportioner outlets 13A, 13B, and 13C, respectively.

Figure 2B:
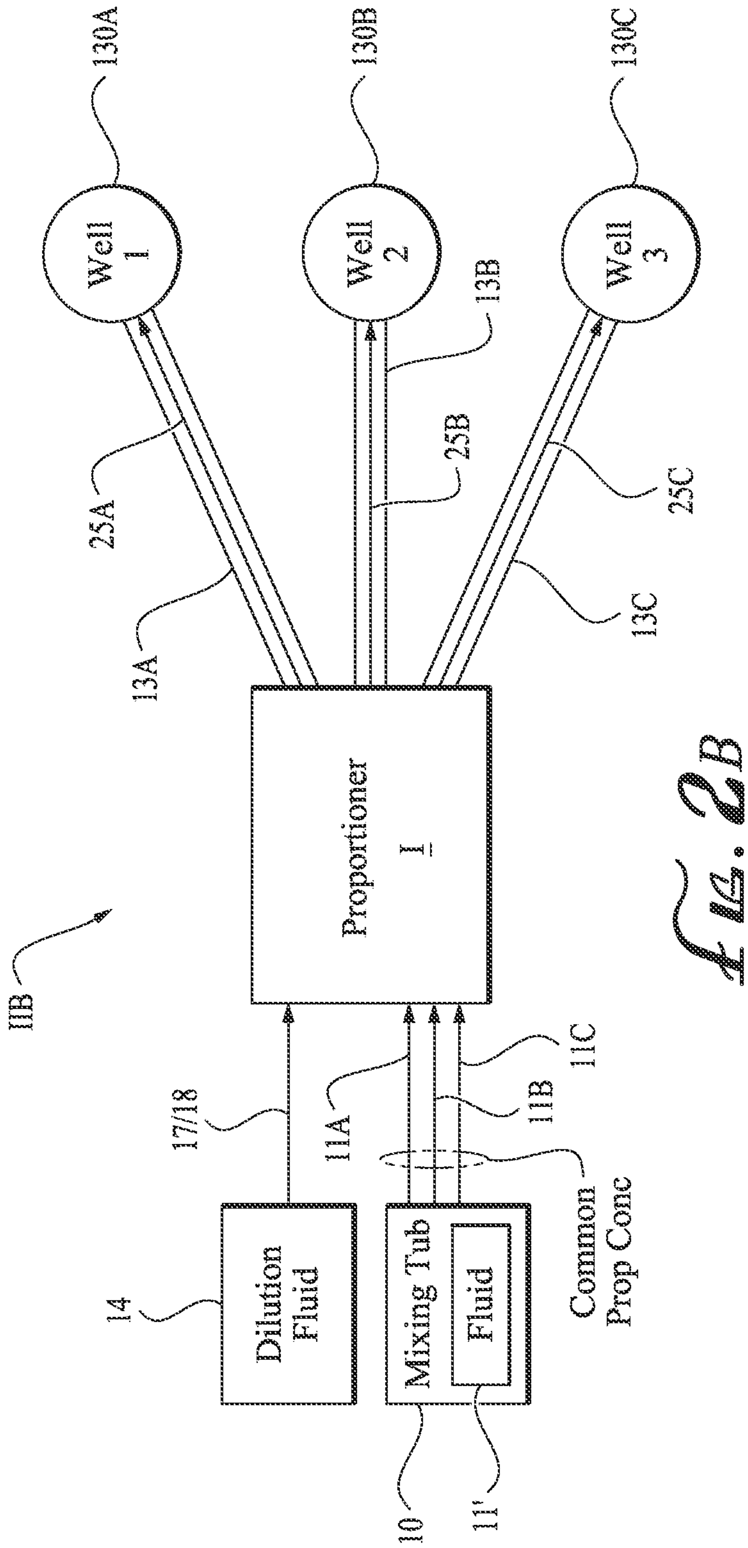
FIG. 2B is a schematic of another system, according to embodiments of this disclosure.

As depicted in FIG. 2B, which is a schematic of another system IIB, according to embodiments of this disclosure, in embodiments, a proportioner I of this disclosure is fed concentrated proppant slurry fluid via a blender/mixer 10 that provides three independent concentrated proppant slurry streams for proportioner inlets 11A, 11B, and 11C. The proppant concentration in each of the independent proppant slurry streams can, in such embodiments, be the same or different. In embodiments, three disparate proppant slurries are provided by a blending unit as described in U.S. patent application Ser. No. 18/632,640, filed Apr. 11, 2024, now U.S. Pat. No. 12,281,557, and entitled, "Multi-Well Blending System", the disclosure of which is hereby incorporated herein in its entirety for purposes not contrary to this disclosure.

As noted previously, the control system 30 described (and shown in FIG. 1) as being on the proportioner I could also be a supervisory control system (e.g., control system 40') for either the full fracturing system (e.g., system IIA of FIG. 2A or system IIB of FIG. 2B) or some portion of the fracturing system (e.g., for all blending equipment for example). Thus, a controller 40' could be utilized/operable for controlling the proppant concentration at the proportioner outlets 13, and could also control the proppant concentrations at each wellhead/well 130. If the split flow method is used in the fracturing process, the proppant (e.g., sand) concentration delivered to the wellhead/well 130 can be lower than the proppant concentration of the composition 25 at the proportioner outlet lines 13.

Reference will now be made to FIG. 3, which is a block diagram of a hydraulic fracturing system 100 treating one well 130, the hydraulic fracturing system 100 comprising a proportioner I according to embodiments of the disclosure, FIG. 4, which is a block diagram of a hydraulic fracturing system 170 treating two wells 130A/130B, the hydraulic fracturing system comprising a proportioner I according to embodiments of the disclosure, and FIG. 5, which is a block diagram of a hydraulic fracturing system 200 treating two wells 130A/130B with two pumping groups, the hydraulic fracturing system 200 comprising at least one proportioner I according to embodiments of the disclosure.

In embodiments, the proportioner outlet line 13 of at least one of the at two or more flow lines 16 can be fluidly connected with a first fracturing manifold 124 fluidly connected with a first set of (e.g., high pressure) fracturing pumps 122 configured to introduce a first fluid (e.g., a "dirty" fluid comprising proppant) 123 into a first well 130. The proportioner outlet line 13 of at least one other of the two or more discharge pumps 20 can be fluidly connected with a second fracturing manifold 124 fluidly connected with a second set of (e.g., high pressure) fracturing pumps 122 configured to introduce a second fluid (e.g., a second "dirty" fluid comprising proppant) 123 into a second (different) well 130. FIG. 3 depicts the proportioner outlet line 13B introducing fluid therein (e.g., composition 25B) into a manifold 124, wherein low pressure lines 126 introduce the fluid into the high pressure fracturing pumps 122, and high pressure fluid is returned via high pressure lines 128 to line 123 for introduction into the well 130 for treatment. A similar arrangement of manifold and frac pumps 122 can be associated with the proportioner outlet lines 13A and 13C, which, for clarity, are not duplicated in FIG. 3. FIG. 3 also shows water supply 112, hydration blender 114, and chemical supply 116 that can be utilized, in addition with proppant supply 118 to introduce water, chemicals, and proppant to the blender tub 10 that provides the concentrated proppant fluid 11 (e.g., 11A/11B/11C) to the proportioner I. The water 112 and chemicals can be combined in hydration blender 114 for introduction into the blending tub 10, as needed. A proppant container or source 118 can be utilized to dump or otherwise introduce the proppant into the blending tub 10 or other mixer of the bending system.

Frac pumps 122 can be high pressure (e.g., positive displacement) pumps, while discharge/boost pumps 20 of proportioner I, when present, can be low pressure (e.g., centrifugal) pumps.

As noted hereinabove, the proppant concentration of the fluid 25B being introduced into the manifold 124 can be different from the proppant concentration of the fluid 25A and/or the fluid 25C being introduced into a different manifold 124. The common proppant supply 11 can be obtained from a single blender/mixing tub 10 fed by a single proppant feed 118A (e.g., from a single proppant container or source 118).

The hydraulic fracturing system 100 of FIG. 3 can be utilized to pump hydraulic fracturing fluids 123 into a wellbore 130, is illustrated. As depicted, a plurality of hydraulic fracturing pumps 122 (also referred to as "frac pump" or high horsepower pumps) can be connected in parallel to a fracturing manifold 124 (also referred to as a "missile") to provide fracturing fluids 123 to the treatment well 130 (also referred to as the wellhead). The fracturing fluids are typically a blend of friction reducer and water, e.g., slick water, and proppant. In some cases, a gelled fluid (e.g., water, a gelling agent, optionally a friction reducer, and/or other additives) may be created in a hydration blender 114 from the water supply unit 112 and gelling chemicals from the chemical unit 116. When slick water is used, the hydration blender 114 can be omitted. The proppant can be added at a controlled rate to the gelled fluid in the blender/mixing tub 10. The proportioner I is in fluid communication with the manifold 124 so that the fracturing treatment is pumped into the manifold 124 for distribution to the frac pumps 122, via (e.g., low pressure) supply line 126. The fracturing fluids are returned to the manifold 124 from the frac pumps 122, via high pressure line 128, to be pumped into the treatment well 130 that is in fluid communication with the manifold 124. Although fracturing fluids typically contain a proppant, a portion of the pumping sequence may include a fracturing fluid without proppant (sometimes referred to as a pad fluid or a flush fluid herein). Although fracturing fluids typically include a gelled fluid, the fracturing fluid may be blended without a gelling chemical. Alternatively, the fracturing fluids can be blended with an acid to produce an acid fracturing fluid, for example, pumped as part of a spearhead or acid stage that clears debris that may be present in the wellbore and/or fractures to help clear the way for fracturing fluid to access the fractures and surrounding formation.

A control van 110 can be communicatively coupled (e.g., via a wired or wireless network) to any of the frac units wherein the term "frac units" may refer to any of the plurality of frac pumps 122, a manifold 124, a blending system 60 comprising a proportioner of this disclosure. The managing application 136 executing on a computer (e.g., server) 132 within the control van 110 can establish unit level control over the frac units communicated via the network. Unit level control can include sending instructions to the frac units and/or receiving equipment data from the frac units. For example, the managing application 136 within the control van 110 can establish a pump rate of 25 bpm with the plurality of frac pumps 122 while receiving pressure and rate of pump crank revolutions from sensors on the frac pumps 122. The control van 110 can thus comprise controller 30 described above for controlling operation of proportioner I and/or blending system 60.

Although the managing application 136 is described as executing on a computer 132, it is understood that the computer 132 can be a computer system, for example computer system 380 in FIG. 10, or any form of a computer system such as a server, a workstation, a desktop computer, a laptop computer, a tablet computer, a smartphone, or any other type of computing device. The computer 132 (e.g., computer system) can include one or more processors, memory, input devices, and output devices, as described in more detail further hereinafter. Although the control van 110 is described as having the managing application 136 executing on a computer 132, it is understood that the control van 110 can have 2, 3, 4, or any number of computers 132 (e.g., computer systems) with 2, 3, 4, or any number of managing applications 136 executing on the computers 132.

The fracturing fleet can be divided into two pumping groups that share a proportioner I of this disclosure to simultaneously treat two (or more) wells. Turning now to FIG. 4, an embodiment of a hydraulic fracturing system 170 that can be utilized to pump hydraulic fracturing fluids 123 (e.g., 123A, 123B, 123C) into two or three wellbores 130 (e.g., with three wells 130A, 130B, 130C depicted in FIG. 4). As depicted, the capacity of the proportioner can be divided between two or three sets of frac pumps 122. A first set of frac pumps 122 can be connected to a first manifold 124A. A second set of frac pumps 122 can be connected to a second manifold 124B. As shown in FIG. 4, a third set of frac pumps 122 can be connected to a third manifold 124C, in embodiments. As previously described, the proportioner I can produce a proppant slurry composition 25A/25B/25C in proportioner outlet lines 13A/13B/13C from a concentrated proppant slurry fluid 11' formed in mixer 10 by adding proppant, e.g., sand, from the proppant storage unit 118 to slick water blended from water provided by the water supply 112A and a friction reducer from the chemical unit 116A. A first composition 25A (e.g., comprising proppant slurry or clean fluid, as detailed hereinabove) can be pumped via proportioner outlet line 13A to first the first manifold 124A and first set of frac pumps 122, composition 25B (e.g., comprising proppant slurry or clean fluid, as detailed hereinabove) can be pumped through proportioner outlet line 13B to first the second manifold 124B and second set of frac pumps 122, and optionally, a third composition 25C e.g., comprising proppant slurry or clean fluid, as detailed hereinabove) can be pumped through proportioner outlet line 13C to third manifold 124C and third set of frac pumps 122. In embodiments, only one, two, four, or more manifolds can be fluidly connected with a proportioner I of this disclosure.

Via the use of a proportioner I of this disclosure, the total volumetric rate of slurry composition 25 received from proportioner outlet lines 13 (e.g., and optionally received by the wellbores 130) can exceed the total volumetric rate output of the mixing tub 10, due to the dilution of the concentrated proppant in line 11' from mixing tub 10 with dilution fluid 14 as described hereinabove. As the volumetric rate output of the mixing tub 10 can be limited by the maximum proppant, e.g., sand, mixing in mixing tub 10, utilization of a proportioner I as detailed herein can enable additional volumetric rate output with the use of a single mixing tub 10. A plurality of frac pumps 122 can be connected in parallel to the first manifold 124A. Likewise, a plurality of frac pumps 122 can be connected in parallel to the second manifold 124B. In embodiments, a plurality of frac pumps 122 can also be connected in parallel to a third manifold 124C. Although two frac pumps 122 are shown, it is understood that 1, 2, 4, 8, 16, or any number of frac pumps 122 can connect in parallel to first manifold 124A, second manifold 124B, and/or third manifold 124C.

A first wellbore 130A can receive a volume of fluid (e.g., proppant slurry having a first proppant concentration) from the first manifold 124A via high pressure line 123A. A second wellbore 130B can receive a volume of fluid (e.g., proppant slurry having a second proppant concentration) from the second manifold 124B via high pressure line 123B. In embodiments, a third wellbore 130C can receive a volume of fluid (e.g., proppant slurry having a third proppant concentration) from the third manifold 124C via high pressure line 123C. The first proppant concentration, the second proppant concentration, and the third proppant concentration can be the same or different.

A control van (e.g., control van 110 from FIG. 3) can be communicatively coupled (e.g., via a wired or wireless network) to all of the frac units, wherein the term "frac units" may refer to any of the plurality of frac pumps 122, a manifold (e.g., 124A/124B/124C), a blending system 60 comprising a proportioner of this disclosure. The managing application 136 executing on a computer (e.g., server) 132 within the control van 110 can establish unit level control over the frac units communicated via the network. Unit level control can include sending instructions to the frac units and/or receiving equipment data from the frac units.

As noted hereinabove, to increase the pumping capacity of the available pumping equipment, the fracturing fleet can be divided into a clean pumping group and a dirty pumping group, in embodiments. Turning now to FIG. 5, an embodiment of a hydraulic fracturing system 200 that can be utilized to pump hydraulic fracturing fluids into two wellbores, is illustrated. As depicted, the pumping capacity of the fracturing fleet can be divided into a dirty fluid group 250 and a clean fluid group 260. The dirty fluid group 250 can comprise a proportioner I of this disclosure utilized as a "dirty" blender connected to a first manifold 124A (e.g., to provide a composition 25A comprising proppant thereto) and a second manifold 124B (e.g., to provide a composition 25B comprising proppant thereto). As previously described, the proportioner I can produce a multiple proppant slurry compositions 25 from a concentrated proppant fluid 11' provided by blending tub 10 by adding proppant from the proppant storage unit 118 to a gelled fluid blended from water provided by the water supply 112A and gelling chemicals or friction reducers from the chemical unit 116A to produce concentrated proppant in proportioner inlet lines 11 which can be diluted via the addition of dilution fluid 14 as described hereinabove to provide the composition 25 in each proportioner outlet line 13. The proppant slurry composition 25A, e.g., a dirty fluid, can be pumped through manifold feed line/proportioner outlet line 13A (or a line fluidly connected thereto) to first dirty manifold 124A and proppant slurry composition 25B, e.g., a dirty fluid, can be pumped through can manifold feed line/proportioner outlet line 13B to second dirty manifold 124B. A plurality of frac pumps 122 can be connected in parallel to first manifold 124A and second manifold 124B. The clean fluid group 260 can comprise a clean blender 212 (e.g., a mixing blender) connected to a clean manifold 124C and a clean manifold 124D. In some cases, the clean blender 212 can be replaced with a boost pump, e.g., centrifugal pump, with chemical port to receive a chemical additive, such as a friction reducer. As previously described, the clean blender 212 can produce a slick water fluid blended from water provided by the water supply 112B and friction reducer chemicals from the chemical unit 116B. The slick water fluid, e.g., the clean fluid, can be pumped through feed line 13D to first clean manifold 124C, e.g., third manifold 124C, and feed line 13E to second clean manifold 124D, e.g., fourth manifold 124D. A plurality of frac pumps 122 can connect in parallel to third manifold 124C and fourth manifold 124D. In some embodiments, blender 212 can be a proportioner I of this disclosure. In such embodiments, blender 212 can be utilized to provide a composition to dirty manifold 124A or 124B via blending unit 212 outlet line 13F. As shown, in embodiments, proportioner I can provide clean fluid via blending outlet line 13C (for example, by closing concentrated proppant valve CPV on the common proppant line 11) for use in manifold 124C or 124D, if needed.

A first wellbore 130A can receive a combined treatment volume (via line 223A) comprising a clean fluid volume and a dirty fluid volume from the clean fluid group 260 and the dirty fluid group 250, respectively. The dirty fluid group 250 can provide a dirty fluid volume via the first manifold 124A fluidly connected to a wye block 232A by high pressure line 222A. The clean fluid group 260 can provide a clean fluid volume via the first clean manifold 124C, e.g., third manifold 124C, fluidly connected to the wye block 232A by high pressure line 222C. High pressure connector 223A delivers the combined treatment volume from the wye block 232 to the first wellbore 130A. The wye block 232A can be a solid block, a manifold, a tubing branch, or any suitable high pressure connection.

A second wellbore 130B can receive a combined treatment volume (via line 223B) comprising a clean fluid volume and a dirty fluid volume from the clean fluid group 260 and the dirty fluid group 250, respectively. The dirty fluid group 250 can provide a dirty fluid volume via the second dirty manifold 124B fluidly connected to a wye block 232B by high pressure line 222B. The clean fluid group 260 can provide a clean fluid volume via the fourth manifold 124D fluidly connected to the wye block 232B by high pressure line 222D. High pressure connector 223B delivers the combined treatment volume from the wye block 232B to the second wellbore 130B. The wye block 232B can be a solid block, a manifold, a tubing branch, or any suitable high pressure connection.

Alternatively, a combination manifold can be used to combine the dirty fluid volume and clean fluid volume to a single output. A combination manifold comprises a clean low pressure side manifold, e.g., 124C and 124D, a dirty low pressure side manifold, e.g., 124A and 124B, and a unitary high pressure manifold that combines the fluid outputs of the pumps 122 to a single high pressure line fluidly connected to a wellbore (e.g., 130A and 130B).

A first combination manifold can comprise the clean low pressure side manifold 124C fluidly connected to a clean group of pumps 122 via supply line 126 and the dirty low pressure side manifold 124A fluidly connected to a dirty group of pumps 122 via supply line 126 (as shown in FIG. 3). The dirty low pressure side manifold 124A can be fluidly connected to the proportioner I via supply line 13A. The clean low pressure side manifold 124C can be fluidly connected to the clean blender 212 via supply line 13D. The high pressure output from the clean group of pumps 122 and dirty group of pumps 122, connected to the combination manifold, can fluidly connect via high pressure line 128 (as shown in FIG. 3) to a unitary manifold output. The high pressure lines 222A and 222C can be replaced by high pressure line 223A connecting the combination manifold to the first wellbore 130A.

A second combination manifold can comprise the clean low pressure side manifold 124D fluidly connected to a clean group of pumps 122 via supply line 126 and the dirty low pressure side manifold 124B fluidly connected to a dirty group of pumps 122 via supply line 126 (as shown in FIG. 3). The dirty low pressure side manifold 124B can be fluidly connected to the dirty blender/proportioner I from supply line 13B. The clean low pressure side manifold 124D can be fluidly connected to the clean blender 212 via supply line 13E. The high pressure output from the clean group of pumps 122 and dirty group of pumps 122, connected to the combination manifold, can fluidly connect via high pressure line 128 (as shown in FIG. 3) to a unitary manifold output. The high pressure lines 222B and 222D can be replaced by high pressure line 223B connecting the combination manifold to the second wellbore 130B.

Again, a control van (e.g., control van 110 from FIG. 3) can be communicatively coupled (e.g., via a wired or wireless network) to any of the clean frac units or dirty frac units. The managing application 136 executing on a computer (e.g., server) 132 within the control van 110 can establish unit level control over the frac units communicated via the network. Unit level control can include sending instructions to the frac units and/or receiving equipment data from the frac units.

In embodiments, a method of this disclosure comprises: using the proportioner I of this disclosure to produce a first proportioner outlet composition 25A from one of the two or more proportioner outlets 13, and a second proportioner outlet composition 25B from a second of the two or more proportioner outlets 13, wherein the first proportioner outlet composition 25A has a first proppant concentration and the second proportioner outlet composition 25B has a second proppant concentration, and wherein the first proppant concentration and the second proppant concentration are the same or different.

The method can further comprise utilizing the first proportioner outlet composition 25A in a wellbore treatment of a first well 130A and utilizing the second proportioner composition 25B in a wellbore treatment of a second well 130B, wherein the first well 130A and the second well 130B are different. The wellbore treatment of the first well 130A and the wellbore treatment of the second well 130B can comprise hydraulic fracturing.

In embodiments, each of the two or more flow lines 16 can be associated with a concentrated proppant valve CPV, and the injection point 12 of each of the metering systems 22 is configured to provide proppant-free fluid 14 from the one or more fluid inlets 17/18 to the flow line 16 with which it is associated downstream of the concentrated proppant valve CPV, whereby substantially proppant-free fluid 14 can be produced at the proportioner outlet 13 of that flow line 16, and the method can further comprise: producing a slurry comprising proppant as the first proportioner outlet composition 25A by an open concentrated proppant valve CPV1 on the flow line 16A associated with the first proportioner outlet 13A; and producing a substantially proppant-free fluid as the second proportioner outlet composition 25B by closing the concentrated proppant valve CPV2 on the flow line 16B associated with the second proportioner outlet 13B. The method can further comprise utilizing the first proportioner outlet composition 25A for fracturing a first well 130A, while simultaneously flushing a second well 130B with the second proportioner outlet composition 25B. This can enable simulfrac with decoupled transition time from proppant laden fluid to flush fluid for each well 130.

In embodiments, the proportioner I comprises at least three flow lines 16, and the proportioner I further comprises a composition crossover line (or flow path) 26 fluidly connecting each of the at least three flow lines 16 with at least one other of the at least three flow lines 16, and a composition crossover valve CCV on the crossover line 26 that can be opened or closed to permit or prevent fluid flow between the each of the at least three flow lines 16 and the at least one other of the at least three flow lines 16. In such embodiments, the method can further comprise: pumping the first proportioner outlet composition 25A to a first well 130A via a first discharge pump 20A on the flow line 16A associated with the first proportioner outlet 13A; pumping the second proportioner outlet composition 25B to a second well 130B via a discharge pump 20B associated with the flow line 16B associated with the second proportioner outlet 13B; and upon failure of the first discharge pump 20A or the second discharge pump 20B, utilizing a third discharge pump 20C associated with the flow line 16C associated with a third proportioner outlet 13C as backup for the failed discharge pump 20 by opening the composition crossover valve CCV between the proportioner outlet 13C of the third discharge pump 20C and the proportioner outlet 13 of the failed discharge pump.

In embodiments, the proportioner I can be operated in split flow mode such that the first proportioner outlet composition 25A comprises proppant slurry, and the second proportioner outlet composition 25B comprises a substantially proppant-free fluid. In such embodiments, the method can further comprise introducing the first proportioner outlet composition 25A comprising the proppant slurry to a first (e.g., dirty) fracturing manifold 124 fluidly connected with a first set of (e.g., high pressure) fracturing pumps 122 configured to introduce a first dirty fluid (e.g., comprising proppant) comprising the first proportioner outlet composition 25A into a first well 130A, and introducing the second proportioner outlet composition 25B comprising the substantially proppant-free fluid to the first fracturing manifold 124 or to a second (e.g., clean or dirty) fracturing manifold 124 fluidly connected with a second set of (e.g., high pressure) fracturing pumps 122 configured to introduce a clean or dirty fluid into the first well 130A or a second (e.g., different) well 130B.

The method can further comprise feeding the first proportioner outlet composition 25A to a first fracturing manifold 124 fluidly connected with a first set of (e.g., high pressure) fracturing pumps 122 configured to introduce a first dirty fluid (e.g., comprising proppant) into a first well 130A, and introducing the second proportioner outlet composition 25B to a second fracturing manifold 124 fluidly connected with a second set of (e.g., high pressure) fracturing pumps 122 configured to introduce a dirty fluid (e.g., comprising proppant) into a second (e.g., different) well 130B.

In embodiments, a method of this disclosure comprises: providing to a proportioner I a concentrated proppant fluid supply 11' comprising a concentrated concentration of a proppant 118; and producing, via a first metering system 22A of the proportioner I, a first proportioner outlet composition 25A via a proportioner outlet 13A of one of two or more flow lines 16 of the proportioner I, and, producing via a second metering system 22B of the proportioner, a second proportioner outlet composition 25B via another proportioner outlet 13B of another of the two or more flow lines 16 of the proportioner I, wherein the first proportioner outlet composition 25A, the second proportioner outlet composition 25B, or both comprise a proportionate amount of the concentrated proppant fluid supply 11', wherein the first proportioner outlet composition 25A has a first proppant concentration and the second proportioner outlet composition 25B has a second proppant concentration, and wherein the first proppant concentration and the second proppant concentration are different, and wherein the first proppant concentration and the second proppant concentration are less than the concentrated concentration.

The first proportioner outlet composition 25A and the second proportioner outlet composition can comprise a same or different proportionate amount of the concentrated proppant fluid supply 11'. Producing the first proportioner outlet composition 25A can comprise combining, via the metering system 22A, the concentrated proppant fluid supply 11' with a first proportional stream of a substantially proppant-free fluid 14, and producing the second proportioner outlet composition 25B can comprise combining, by the second metering system 22B, the concentrated proppant supply 11' and a second proportional stream of the substantially proppant-free fluid 14. The method can further comprise utilizing the first proportioner outlet composition 25A to treat a first well 130A, and utilizing the second proportioner outlet composition 25B to treat a second well 130B. The first proportioner outlet composition 25A can comprise an amount of the concentrated proppant fluid supply 11', the second proportioner outlet composition 25B can comprise substantially proppant-free fluid.

Producing the first proportioner outlet composition 25A can thus comprise combining the amount of the concentrated proppant fluid supply 11' with a proportional stream of a substantially proppant-free fluid 14. The method can further comprise introducing the first proportioner outlet composition 25A to treat a first well 130A, and utilizing the second proportioner outlet composition 25B to treat (e.g., flush) a second well 130B.

As described hereinabove with reference to FIG. 4, the method can further comprise introducing the first proportioner outlet composition 25A comprising the proppant 118 to a first fracturing manifold 124 fluidly connected with a first set of (e.g., high pressure) fracturing pumps 122 configured to introduce a first dirty fluid (e.g., comprising proppant) comprising the first proportioner outlet composition 25A into a first well 130A, and introducing the second proportioner outlet composition 25B comprising the substantially proppant-free fluid 14 to the first fracturing manifold 124 or to a second fracturing manifold 124 fluidly connected with a second set of (e.g., high pressure) fracturing pumps 122 configured to introduce a clean fluid into a second (e.g., different) well 130B.

A method of this disclosure can further comprise utilizing at least one of the two or more flow lines 16 and associated metering systems 22 as backup for at least one other of the two or more flow lines 16 and associated metering systems 22.

In embodiments, a method of this disclosure comprises: utilizing a single mixing tub 10 to produce a concentrated proppant stream 11' comprising a concentrated concentration of a proppant 118; and utilizing each of two or more flow lines 16 and associated metering systems 22 to independently provide an outlet composition 25, wherein a proppant concentration of the outlet composition 25 of at least one of the two or more flow lines 16 is different from an outlet composition 25 of another of the two or more flow lines 16, wherein the outlet composition 25 of each of the two or more flow lines 16 comprises from zero to the concentrated composition of the proppant, and wherein at least one of the outlet compositions 25 comprises proppant, and wherein valving (CPV, V, CCV) and the metering systems 22 enable introduction of the concentrated proppant stream 11', a proportional amount of one or more substantially proppant-free fluids 14, or both into the outlet composition 25 provided by each of the two or more flow lines 16.

The proportioner I is referred to as a proportioner, as it combines the dilution fluid(s) as a proportion of the concentrated proppant slurry fluid 11'. For example, the flow rate of the dilution fluid(s) introduced into the concentrated proppant slurry 11' in the flow lines 16 is always a proportion (e.g., less than 100%, for example, 10%, 20%, 30%, 40%, etc.) of the flow rate of the concentrated proppant slurry fluid 11' in that flow line 16.

A pumping schedule to simultaneously treat two or more wells 130 can be created based on pumping equipment availability, and can be designed and controlled as known in the art, for example, as described in U.S. Pat. No. 11,506,032 entitled, "Method To Reduce Peak Treatment Constituents in Simultaneous Treatment of Multiple Wells," the disclosure of which is hereby incorporated herein for purposes not contrary to this disclosure.

FIG. 10 illustrates a computer system 380 suitable for implementing one or more embodiments disclosed herein, for example implementing one or more computers, servers or the like as disclosed or used herein, including without limitation any aspect of the computing system associated with controller 30 or control van 110 (e.g., computer 132). The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

The herein described proportioner I and methods of using same enable the use of a single slurry fluid 11' (e.g., from a single blender/mixer 10 at the location (e.g., at the wellsite)) and a single (or a plurality of) dilution fluid(s) 14 as inputs to provide multiple outlet fluid compositions 25, where the composition 25 from each proportioner outlet 13 is a unique ratio (or "proportion) of the concentrated slurry fluid 11' and each dilution fluid 14.

The herein described proportioner I and methods of using same can also provide the benefit of using a single concentrated proppant stream 11' to supply proppant to multiple wells 130. For example, a single forklift can be utilized to load containers of proppant 118 onto a single (e.g., Halliburton ExpressSand Support) structure, but this proppant (e.g., sand) can be fed to multiple wells 130 at unique sand concentrations in the composition 25 to each well 130.

The proportioner I allows diluting the concentrated proppant slurry 11' at various (e.g., different) dilution ratios (or "proportions") for each of a plurality of wells 130. The fluid proportioner I allows for "on the fly" mixing of the fluid compositions 25 during fracturing operations, rather than pre-mixing which is generally needed with conventional blending. Multiple fluid compositions 25 can be produced at the wellsite. In embodiments, the proportioner I is packaged as a mobile unit or units (e.g., on a skid(s) or trailer(s) 47).

As opposed to conventional systems, which sometimes utilize a ratio of two fluid compositions provided to each well and controlled by varying the rate of the frac pumps supplying the fluids to each well bore (in other words, by adjusting the clean/dirty split ratio), the herein disclosed proportioner I and methods enable blending of the dilution fluid 14 with the concentrated proppant slurry 11' on a low-pressure portion of the fracturing equipment spread.

Via this disclosure, independent proppant (e.g., sand) concentrations for two or more wells can be mixed simultaneously using a single blender/mixer 10 with a single mix tub. This can reduce a number of blenders/mixers 10 required on location, and can also simplify the proppant delivery equipment feeding the blender/mixer 10 since all proppant for the blending system 60A/60B can be received at a single point, thus reducing capital, footprint, and/or rig-up complexity.

In embodiments, a fluid proportioner of this disclosure comprises one or more proportioner inlets 11 (e.g., 11A, 11B, and/or 11C) for accepting a proppant laden fluid 11'*c* of common composition (e.g., from a blender or mixing tub 10); a fluid inlet 17 and/or 18 on the proportioner I; two or more proportioner outlets 13 (e.g., proportioner outlet 13A, proportioner outlet 13B, and/or proportioner outlet 13C);

and a metering arrangement or system 22 upstream of each proportioner outlet 13 for proportioning a fluid 14 to the proppant laden fluid 11' in proportioner inlets or flow lines 11 such that there is a different fluid composition 25 (e.g., fluid composition 25A, fluid composition 25B, and/or fluid composition 25C) exiting each proportioner outlet 13. The proportioner I of this disclosure allows for the slurry 11' discharged from a single blender or mixing apparatus 10 to be modified for simulfrac or trimulfrac operations, such that the sand concentration, friction reducer concentration, or both delivered to each downstream well 130 (e.g., first well 130A, second well 130B, and/or third well 130C) can be customized.

In embodiments, a proportioner of this disclosure enables simulfrac or trimulfrac with independent proppant concentrations to each well 130 while using a single slurry mixing tub 10.

In embodiments, a fluid composition 25 absent proppant (e.g., a proppant-free fluid 25 comprising one or more dilution fluids 14) can be provided by one flow line 16 and associated metering systems 22 and utilized to flush a first well 130 while a second flow line 16 and associated metering system 22 can be operated to providing proppant laden fluid 25 to at least a second well 130. This can enable simulfrac with decoupled transition time from proppant laden fluid to flush fluid for each well 130.

In embodiments, a proportioner I of this disclosure can comprise composition crossover lines 26 and associated composition crossover valves CCV, and can be operated (e.g., controlled by controller 30 and/or supervisory controller 40') to selectively connect a backup (e.g., a second) flow line 16 to proportioner outlets 13 of other flow line(s) 16 (e.g., proportioner outlets 13 A and 13C of the first and third flow lines 16A and 16C). Such an arrangement can enable one of the flow lines 16 and associated metering systems 22 to serve as a backup, for example, as backup to both a "clean" flow line 16 providing a proppant-free fluid composition 25 and a "dirty" fluid composition 25 comprising proppant, when the proportioner I is operated in split flow mode.

The proportioner can provide an installed backup flow line 16 and associated metering system 22 when the proportioner is used for supplying dirty side fluid for a two well simulfrac or when supplying both dirty and clean side fluid for a single well split flow job. This can enable a reduction in blender attributable non-productive time (NPT) as compared to conventional blending equipment.

As detailed hereinabove, the herein proportioner and methods can enable simultaneous delivery of multiple slurry streams (e.g., fluid compositions 25) of different proppant concentrations via a single mix tub 10.

Conventional blenders utilize two tubs or mixers when mixing fluids for multiple (e.g., two) wells. Conventional prior art blenders typically have a single slurry discharge pump associated with each mixing tub, and can only deliver a slurry having a single proppant concentration, even if delivering the fluid to multiple wells. In embodiments, the herein disclosed proportioner can be utilized to supply proppant laden fluid to one (or more) flow lines 16 and proportioner outlets 13 while simultaneously providing clean (e.g., substantially proppant-free) fluid to (or from) one or more of the other flow lines 16 while using only a single (e.g., one only) mixing tub 10 (that is without using a second mix tub).

The disclosed proportioner and methods enable dilution of a common, concentrated proppant (e.g., provided by mixing tub 10 via concentrated proppant lines/proportioner inlets 11) with a dilution fluid 14 on a low pressure side of fracturing pumps 122, rather than via combination on a high pressure side downstream of high pressure pumps 122. This can enable more efficient operation of the high pressure pumps 122.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

ADDITIONAL DISCLOSURE

The following are non-limiting, specific embodiments in accordance with the present disclosure:

In a first embodiment, a proportioner comprises: one or more proportioner inlets configured to receive a common (e.g., the same) concentrated proppant fluid comprising a proppant; two or more flow lines fluidly connected to the one or more proportioner inlets; two or more proportioner outlets, each of the two or more proportioner outlets associated with (a different) one of the two or more flow lines; one or more fluid inlets, each of the one or more fluid inlets configured to introduce a (e.g., same or different) proppant-free fluid to the proportioner; and a metering system associated with at least one of the two or more flow lines, each at least one metering system upstream of the proportioner outlet of the flow line with which it is associated and each metering system fluidly connected with at least one of the one or more fluid inlets and configured for proportioning one of the proppant-free fluids into the associated flow line at an injection point.

A second embodiment can include the proportioner of the first embodiment further comprising a discharge pump on each of the flow lines.

A third embodiment can include the proportioner of the second embodiment, wherein the discharge pump is upstream or downstream from the injection point.

A fourth embodiment can include the proportioner of the second or third embodiment, wherein the injection point associated with at least one of the two or more flow lines is downstream from the discharge pump on that at least one of the two or more flow lines.

A fifth embodiment can include the proportioner of any one of the first to fourth embodiments, wherein the proportioner outlet associated with a first of the two or more flow lines is fluidly connected with a first well and wherein a proportioner outlet of a second of the two or more flow lines is fluidly connected with a second well, wherein the first well and the second well are different wells.

A sixth embodiment can include the proportioner of any one of the first to fifth embodiments further comprising a control system operable to control operation of the proportioner to provide a fluid composition from each of the proportioner outlets, wherein the fluid composition provided via the proportioner outlet of at least one of the two or more flow lines has a different proppant concentration and/or a different concentration of a proppant-free fluid (e.g., slick-water, friction reducer, water, gels, produced water, flow-back water, etc.) introduced by at least one of the fluid inlets than the composition provided by the proportioner outlet of at least one other of the two or more flow lines.

A seventh embodiment can include the proportioner of any one of the first to sixth embodiments, wherein the common concentrated proppant fluid comprises a concentrated proppant slurry from a single mixer (e.g., mixing tub) or a plurality of mixers.

An eighth embodiment can include the proportioner of any one of the first to seventh embodiments, wherein each metering system comprises a flow meter and a throttling valve configured to introduced a proppant-free flow rate of the proppant-free fluid introduced by at least one of the one or more fluid inlets into a flow rate of the concentrated proppant fluid in the flow line associated with each of the at least one metering systems.

A ninth embodiment can include the proportioner of the eighth embodiment further comprising a concentrated proppant valve on the each flow line upstream of the injection point, and wherein the proportioner is operable to produce a proppant slurry comprising the proppant from at least one of the two or more proportioner outlets and simultaneously produce a substantially proppant-free fluid from the proportioner outlet of at least one other of the two or more proportioner outlets by closing the concentrated proppant valve on the flow line associated with the at least one other of the two or more proportioner outlets.

A tenth embodiment can include the proportioner of the eighth or ninth embodiment further comprising a crossover line (or flow path) fluidly connecting each of the two or more flow lines, downstream of the injection point, with at least one other of the two or more flow lines, and a crossover valve on the crossover line, wherein the crossover valve can be opened or closed to permit or prevent fluid flow between the each flow line and the at least one other of the two or more flow lines.

An eleventh embodiment can include the proportioner of any one of the first to tenth embodiments, wherein the proportioner is configured on a trailer, a skid, multiple skids, or a combination thereof.

A twelfth embodiment can include the proportioner of any one of the first to eleventh embodiments, wherein the proportioner outlet associated with at least one of the two or more flow lines is fluidly connected with a first fracturing manifold fluidly connected with a first set of (e.g., high pressure) fracturing pumps configured to introduce a first dirty fluid (e.g., comprising proppant) into a first well, and wherein the proportioner outlet associated with at least one other of the two or more flow lines is fluidly connected with a second fracturing manifold fluidly connected with a second set of (e.g., high pressure) fracturing pumps configured to introduce a second dirty fluid (e.g., comprising proppant) into a second (e.g., different) well.

A thirteenth embodiment can include the proportioner of the twelfth embodiment, wherein a proppant concentration of the first dirty fluid is different from a proppant concentration of the second dirty fluid.

A fourteenth embodiment can include the proportioner of any one of the first to thirteenth embodiments, comprising a single proportioner inlet or comprising a plurality of proportioner inlets with each of the plurality of proportioner inlets fluidly connected to (e.g., a different) one of the two or more flow lines.

A fifteenth embodiment can include the proportioner of any one of the first to fourteenth embodiments, comprising two or more fluid inlets and/or two or more metering systems fluidly connected to each proportioner outlet.

A sixteenth embodiment can include the proportioner of any one of the first to fifteenth embodiments, wherein the concentrated proppant fluid comprises a concentrated proppant slurry from two or more mixers (e.g., mixing tubs).

In a seventeenth embodiment, a method comprises: using the proportioner of any of the first to sixteenth embodiments to produce a first proportioner outlet composition from one of the two or more proportioner outlets, and a second proportioner outlet composition from a second of the two or more proportioner outlets, wherein the first proportioner outlet composition has a first proppant concentration and the second proportioner outlet composition has a second proppant concentration, and wherein the first proppant concentration and the second proppant concentration are different.

An eighteenth embodiment can include the method of the seventeenth embodiment further comprising utilizing the first proportioner outlet composition in a wellbore treatment of a first well and utilizing the second proportioner composition in a wellbore treatment of a second well, wherein the first well and the second well are different.

A nineteenth embodiment can include the method of the eighteenth embodiment, wherein the wellbore treatment of the first well and the wellbore treatment of the second well comprise hydraulic fracturing.

A twentieth embodiment can include the method of any one of the seventeenth to nineteenth embodiments, wherein each of the two or more flow lines is associated with a concentrated proppant valve, and wherein the injection point of each of the at least one metering systems is configured to provide proppant-free fluid from one of the one or more fluid inlets to the flow line with which it is associated downstream of the concentrated proppant valve, whereby substantially proppant-free fluid can be produced at the proportioner outlet of that flow line, and wherein the method further comprises: producing a slurry comprising proppant as the first proportioner outlet composition by an open concentrated proppant valve on the flow line associated with the first proportioner outlet; and producing a substantially proppant-free fluid as the second proportioner outlet composition by closing the concentrated proppant valve on the flow line associated with the second proportioner outlet.

A twenty first embodiment can include the method of the twentieth embodiment further comprising utilizing the first proportioner outlet composition for fracturing a first well, while simultaneously flushing a second well with the second proportioner outlet composition.

A twenty second embodiment can include the method of any one of the seventeenth to twenty first embodiments, wherein the proportioner comprises at least three flow lines, and wherein the proportioner further comprises a crossover line (or flow path) fluidly connecting each of the at least three flow lines with at least one other of the at least three flow lines, and a crossover valve on the crossover line that can be opened or closed to permit or prevent fluid flow between the each of the at least three flow lines and the at least one other of the at least three flow lines, and wherein the method further comprises: pumping the first proportioner outlet composition to a first well via a first discharge pump on the flow line associated with the first proportioner outlet; pumping the second proportioner outlet composition to a second well via a discharge pump associated with the flow line associated with the second proportioner outlet; and upon failure of the first discharge pump or the second discharge pump, utilizing a third discharge pump associated with the flow line associated with a third proportioner outlet as backup for the failed discharge pump by opening the cross-over valve between the proportioner outlet of the third discharge pump and the proportioner outlet of the failed discharge pump.

A twenty third embodiment can include the method of the twenty second embodiment, wherein the proportioner is operated in split flow mode such that the first proportioner outlet composition comprises proppant slurry, and the second proportioner outlet composition comprises a substantially proppant-free fluid.

A twenty fourth embodiment can include the method of the twenty third embodiment further comprising introducing the first proportioner outlet composition comprising the proppant slurry to a first (e.g., dirty) fracturing manifold fluidly connected with a first set of (e.g., high pressure) fracturing pumps configured to introduce a first dirty fluid (e.g., comprising proppant) comprising the first proportioner outlet composition into a first well, and introducing the second proportioner outlet composition comprising the substantially proppant-free fluid to the first fracturing manifold or to a second (e.g., clean or dirty) fracturing manifold fluidly connected with a second set of (e.g., high pressure) fracturing pumps configured to introduce a clean or dirty fluid into the first or a second (e.g., different) well.

A twenty fifth embodiment can include the method of any one of the seventeenth to twenty fourth embodiments further comprising feeding the first proportioner outlet composition to a first fracturing manifold fluidly connected with a first set of (e.g., high pressure) fracturing pumps configured to introduce a first dirty fluid (e.g., comprising proppant) into a first well, and introducing the second proportioner outlet composition to a second fracturing manifold fluidly connected with a second set of (e.g., high pressure) fracturing pumps configured to introduce a dirty fluid (e.g., comprising proppant) into a second (e.g., different) well.

In a twenty sixth embodiment, a method comprises: providing to a proportioner a concentrated proppant fluid supply comprising a concentrated concentration of a proppant; and producing, via a first metering system of the proportioner, a first proportioner outlet composition via a proportioner outlet of one of two or more flow lines of the proportioner, and, via a second metering system of the proportioner, a second proportioner outlet composition via another proportioner outlet of another of the two or more flow lines of the proportioner, wherein the first proportioner outlet composition, the second proportioner outlet composition, or both comprise a proportionate amount of the concentrated proppant fluid supply, wherein the first proportioner outlet composition has a first proppant concentration and the second proportioner outlet composition has a second proppant concentration, and wherein the first proppant concentration and the second proppant concentration are different, and wherein the first proppant concentration and the second proppant concentration are less than the concentrated concentration.

A twenty seventh embodiment can include the method of the twenty sixth embodiment, wherein both the first proportioner outlet composition and the second proportioner outlet composition comprise a same or different proportionate amount of the concentrated proppant fluid supply.

A twenty eighth embodiment can include the method of the twenty seventh embodiment, wherein producing the first proportioner outlet composition comprises combining, via the metering system, the concentrated proppant fluid supply with a first proportional stream of a substantially proppant-free fluid, and wherein producing the second proportioner outlet composition comprises combining, by the second metering system, the concentrated proppant supply and a second proportional stream of the substantially proppant-free fluid.

A twenty ninth embodiment can include the method of the twenty seventh or twenty eighth embodiments further comprising utilizing the first proportioner outlet composition to treat a first well, and utilizing the second proportioner outlet composition to treat a second well.

A thirtieth embodiment can include the method of any one of the twenty sixth to twenty ninth embodiments, wherein the first proportioner outlet composition comprises an amount of the concentrated proppant fluid supply, wherein the second proportioner outlet composition comprises substantially proppant-free fluid, and wherein producing the first proportioner outlet composition comprises combining the amount of the concentrated proppant fluid supply with a proportional stream of a substantially proppant-free fluid.

A thirty first embodiment can include the method of the thirtieth embodiment further comprising utilizing the first proportioner outlet composition to treat a first well, and utilizing the second proportioner outlet composition to treat (e.g., flush) a second well.

A thirty second embodiment can include the method of the thirtieth or thirty first embodiment further comprising introducing the first proportioner outlet composition comprising the proppant to a first fracturing manifold fluidly connected with a first set of (e.g., high pressure) fracturing pumps configured to introduce a first dirty fluid (e.g., comprising proppant) comprising the first proportioner outlet composition into a first well, and introducing the second proportioner outlet composition comprising the substantially proppant-free fluid to the first fracturing manifold or to a second fracturing manifold fluidly connected with a second set of (e.g., high pressure) fracturing pumps configured to introduce a clean fluid into a second (e.g., different) well.

A thirty third embodiment can include the method of any one of the twenty sixth to thirty second embodiments further comprising utilizing at least one of the two or more flow lines and associated metering systems as backup for at least one other of the two or more flow lines and associated metering systems.

In a thirty fourth embodiment, a method comprises: utilizing one or more mixers (e.g., one or more mixing tubs) to produce a concentrated proppant stream comprising a concentrated concentration of a proppant; and utilizing each of two or more flow lines and associated metering systems to independently provide an outlet composition, wherein a proppant concentration of the outlet composition of at least one of the two or more flow lines is different from an outlet composition of another of the two or more flow lines, wherein the outlet composition of each of the two or more flow lines comprises from zero to the concentrated composition of the proppant, and wherein at least one of the outlet compositions comprises proppant, wherein valving and the metering systems enable introduction of the concentrated proppant stream, a proportional amount of one or more substantially proppant-free fluids, or both into the outlet composition provided by each of the two or more flow lines.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A proportioner comprising:

one or more proportioner inlets configured to receive a common concentrated proppant fluid comprising a proppant;

two or more flow lines fluidly connected to the one or more proportioner inlets;

two or more proportioner outlets, each of the two or more proportioner outlets associated with one of the two or more flow lines;

one or more fluid inlets, each of the one or more fluid inlets configured to introduce a proppant-free fluid to the proportioner;

at least one metering system associated with at least one of the two or more flow lines, each at least one metering system upstream of the proportioner outlet of the flow line with which it is associated and each metering system fluidly connected with at least one of the one or more fluid inlets and configured for proportioning one of the proppant-free fluids into the associated flow line at an injection point; and a crossover line fluidly connecting each of the two or more flow lines, downstream of the injection point, with at least one other of the two or more flow lines, and a crossover valve on the crossover line, wherein the crossover valve can be opened or closed to permit or prevent fluid flow between the each flow line and the at least one other of the two or more flow lines.

2. A proportioner comprising:

one or more proportioner inlets configured to receive a common concentrated proppant fluid supply comprising a concentrated proppant fluid supply concentration of a proppant;

two or more flow lines fluidly connected to the one or more proportioner inlets;

two or more proportioner outlets, each of the two or more proportioner outlets associated with one of the two or more flow lines;

one or more fluid inlets, each of the one or more fluid inlets configured to introduce a proppant-free fluid to the proportioner; and a first metering system of the proportioner to provide a first proportioner outlet composition via a proportioner outlet of one of the two or more flow lines of the proportioner, and, a second metering system to provide a second proportioner outlet composition via a proportioner outlet of another of the two or more flow lines, wherein the first proportioner outlet composition, the second proportioner outlet composition, or both comprise a proportionate amount of the common concentrated proppant fluid supply, wherein the first proportioner outlet composition has a first proppant concentration and the second proportioner outlet composition has a second proppant concentration, and wherein the first proppant concentration and the second proppant concentration are different, and wherein the first proppant concentration and the second proppant concentration are less than the concentrated proppant fluid supply concentration, and wherein the first metering system provides the first proportioner outlet composition by combining the common concentrated proppant fluid supply with a first proportional stream of a substantially proppant-free fluid, and wherein the second metering system provides the second proportioner outlet composition by combining the common concentrated proppant fluid supply and a second proportional stream of the substantially proppant-free fluid.

3. The proportioner of claim 2 further comprising a discharge pump on each of the flow lines, and/or wherein the injection point associated with at least one of the two or more flow lines is downstream from the discharge pump on that at least one of the two or more flow lines.

4. The proportioner of claim 2, wherein the proportioner outlet associated with a first of the two or more flow lines is fluidly connected with a first well and wherein a proportioner outlet of a second of the two or more flow lines is fluidly connected with a second well, wherein the first well and the second well are different wells.

5. The proportioner of claim 2 further comprising a control system operable to control operation of the proportioner to provide a fluid composition from each of the proportioner outlets, wherein the fluid composition provided via the proportioner outlet of at least one of the two or more flow lines has a different proppant concentration and/or a different concentration of a proppant-free fluid introduced by at least one of the fluid inlets than the composition provided by the proportioner outlet of at least one other of the two or more flow lines.

6. The proportioner of claim 2, wherein each metering system comprises a flow meter and a throttling valve configured to introduce a proppant-free flow rate of the proppant-free fluid introduced by at least one of the one or more fluid inlets into a flow rate of the concentrated proppant fluid in the flow line associated with each of the at least one metering systems.

7. The proportioner of claim 6, further comprising a concentrated proppant valve on the each flow line upstream of the injection point, and wherein the proportioner is operable to produce a proppant slurry comprising the proppant from at least one of the two or more proportioner outlets and simultaneously produce a substantially proppant-free fluid from the proportioner outlet of at least one other of the two or more proportioner outlets by closing the concentrated proppant valve on the flow line associated with the at least one other of the two or more proportioner outlets.

8. The proportioner of claim 2, wherein the proportioner outlet associated with at least one of the two or more flow lines is fluidly connected with a first fracturing manifold fluidly connected with a first set of fracturing pumps configured to introduce a first dirty fluid into a first well, and wherein the proportioner outlet associated with at least one other of the two or more flow lines is fluidly connected with a second fracturing manifold fluidly connected with a second set of fracturing pumps configured to introduce a second dirty fluid into a second well.

9. The proportioner of claim 8, wherein a proppant concentration of the first dirty fluid is different from a proppant concentration of the second dirty fluid.

10. The proportioner of claim 2 comprising two or more fluid inlets and/or two or more metering systems fluidly connected to each proportioner outlet.

11. The proportioner of claim 2, wherein the concentrated proppant fluid comprises a concentrated proppant slurry from two or more mixers.

12. A method comprising:

using the proportioner of claim 2 to produce a first proportioner outlet composition from one of the two or more proportioner outlets, and a second proportioner outlet composition from a second of the two or more proportioner outlets, wherein the first proportioner outlet composition has a first proppant concentration and the second proportioner outlet composition has a second proppant concentration, and wherein the first proppant concentration and the second proppant concentration are different.

13. The method of claim 12, further comprising utilizing the first proportioner outlet composition in a wellbore treatment of a first well and utilizing the second proportioner composition in a wellbore treatment of a second well, wherein the first well and the second well are different.

14. The method of claim 12, wherein each of the two or more flow lines is associated with a concentrated proppant valve, and wherein the injection point of each of the at least one metering systems is configured to provide proppant-free fluid from one of the one or more fluid inlets to the flow line with which it is associated downstream of the concentrated proppant valve, whereby substantially proppant-free fluid can be produced at the proportioner outlet of that flow line, and wherein the method further comprises:

producing a slurry comprising proppant as the first proportioner outlet composition by an open concentrated proppant valve on the flow line associated with the first proportioner outlet; and producing the substantially proppant-free fluid as the second proportioner outlet composition by closing the concentrated proppant valve on the flow line associated with the second proportioner outlet.

15. The method of claim 12, wherein the proportioner comprises at least three flow lines, and wherein the proportioner further comprises a crossover line fluidly connecting each of the at least three flow lines with at least one other of the at least three flow lines, and a crossover valve on the crossover line that can be opened or closed to permit or prevent fluid flow between the each of the at least three flow lines and the at least one other of the at least three flow lines, and wherein the method further comprises:

pumping the first proportioner outlet composition to a first well via a first discharge pump on the flow line associated with the first proportioner outlet;

pumping the second proportioner outlet composition to a second well via a discharge pump associated with the flow line associated with the second proportioner outlet; and upon failure of the first discharge pump or the second discharge pump, utilizing a third discharge pump associated with the flow line associated with a third proportioner outlet as backup for the failed discharge pump by opening the crossover valve between the proportioner outlet of the third discharge pump and the proportioner outlet of the failed discharge pump.

16. A method comprising:

providing to a proportioner a concentrated proppant fluid supply comprising a concentrated proppant fluid supply concentration of a proppant; and producing, via a first metering system of the proportioner, a first proportioner outlet composition via a proportioner outlet of one of two or more flow lines of the proportioner, and, via a second metering system of the proportioner, a second proportioner outlet composition via another proportioner outlet of another of the two or more flow lines of the proportioner, wherein the first proportioner outlet composition, the second proportioner outlet composition, or both comprise a proportionate amount of the concentrated proppant fluid supply, wherein the first proportioner outlet composition has a first proppant concentration and the second proportioner outlet composition has a second proppant concentration, and wherein the first proppant concentration and the second proppant concentration are different, and wherein the first proppant concentration and the second proppant concentration are less than the concentrated proppant fluid supply concentration, wherein producing the first proportioner outlet composition comprises combining, via the first metering system, the concentrated proppant fluid supply with a first proportional stream of a substantially proppant-free fluid, and wherein producing the second proportioner outlet composition comprises combining, by the second metering system, the concentrated proppant fluid supply and a second proportional stream of the substantially proppant-free fluid.

17. The method of claim 16, wherein both the first proportioner outlet composition and the second proportioner outlet composition comprise a same or different proportionate amount of the concentrated proppant fluid supply.

18. The method of claim 16, wherein the first proportioner outlet composition comprises an amount of the concentrated proppant fluid supply, wherein the second proportioner outlet composition comprises substantially proppant-free fluid, and wherein producing the first proportioner outlet composition comprises combining the amount of the concentrated proppant fluid supply with a proportional stream of a substantially proppant-free fluid.

19. The method of claim 16 further comprising utilizing at least one of the two or more flow lines and associated metering systems as backup for at least one other of the two or more flow lines and associated metering systems.

20. The method of claim 16, wherein the proportioner further comprises a concentrated proppant valve on the each flow line upstream of an injection point at which the concentrated proppant fluid supply is combined with the substantially proppant-free fluid, and wherein the proportioner is operable to produce a proppant slurry comprising the proppant from at least one of two or more proportioner outlets and simultaneously produce a substantially proppant-free fluid from the proportioner outlet of at least one other of the two or more proportioner outlets by closing the concentrated proppant valve on the flow line associated with the at least one other of the two or more proportioner outlets.

* * * * *